United States Patent
Yamaguchi

(10) Patent No.: US 7,629,706 B2
(45) Date of Patent: Dec. 8, 2009

(54) FEED LIMITING DEVICE FOR LIMITING FEED TO ELECTRICAL COMPONENTS AND CONTROL DEVICE

(75) Inventor: Kazuhi Yamaguchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 106 days.

(21) Appl. No.: 11/707,065

(22) Filed: Feb. 16, 2007

(65) Prior Publication Data

US 2007/0188964 A1 Aug. 16, 2007

(30) Foreign Application Priority Data

Feb. 16, 2006 (JP) ............................. 2006-038983

(51) Int. Cl.
  *B60L 1/00* (2006.01)
  *B60L 3/00* (2006.01)
  *H02G 3/00* (2006.01)
(52) U.S. Cl. ...................................................... 307/9.1
(58) Field of Classification Search ................. 307/9.1, 307/10.1; 180/65.21
  See application file for complete search history.

(56) References Cited

U.S. PATENT DOCUMENTS 6,755,033 B2 * 6/2004 Iwanami et al. ............... 62/133
2002/0117338 A1 * 8/2002 Itou ........................... 180/54.1
2004/0232769 A1 * 11/2004 Pickering .................... 307/10.1

FOREIGN PATENT DOCUMENTS

JP   2001-341596   12/2001
JP   2002-331825   11/2002

* cited by examiner

*Primary Examiner*—Albert W Paladini
*Assistant Examiner*—Carlos Amaya
(74) *Attorney, Agent, or Firm*—Wenderoth, Lind & Ponack, L.L.P.

(57) ABSTRACT

A feed limiting device lessens user discomfort and prevents excessive consumption of a battery. The feed limiting device for limiting feed to units U1-Un mounted on a vehicle in an economy running state, includes a condition satisfaction deciding unit for judging whether a feed limiting condition for limiting the feed to the units U1-Un has been satisfied or not, and a load control unit for limiting the feed to the units U1-Un by controlling each load of the units U1-Un based on an external environment (such as an outside air temperature, a room temperature and an outside illumination) and operating statuses of the units U1-Un when it is judged that the feed limiting condition has been satisfied. The feed limiting condition includes that the vehicle is in the economy running state, and the load control unit is not allowed to limit the loads of the units U1-Un to which it was judged that the present feed had to be maintained.

15 Claims, 17 Drawing Sheets

FEED LIMITING DEVICE FOR LIMITING FEED TO ELECTRICAL COMPONENTS AND CONTROL DEVICE

BACKGROUND OF THE INVENTION

1. Field of the Invention

The present invention relates to a feed limiting device and a control device and, more particularly, to a feed limiting device for limiting feed (i.e., electrical feed) to electrical components (such as head lamps, an air conditioner and an audio system) mounted on a vehicle in an economy running state and a control device.

2. Description of the Relevant Art

Hitherto, in order to meet the requirement of conservation of natural resources, various kinds of techniques whereby fuel efficiency of a vehicle is improved have been proposed, and have been commercially practical. For example, there is a function (so-called economy running function) whereby an engine is automatically stopped when a vehicle is stopped at an intersection or the like, and then, the engine is automatically started when a driver's foot is taken off a brake pedal, resulting in a reduction in fuel consumption during a stop.

When the speed is 0 km/h and the brake pedal is held down, it is judged determined that an engine automatic stop condition has been satisfied and the engine is automatically stopped, leading to the economy running state. The engine automatic stop condition is not limited to that. For example, a condition that a gear is in a neutral position is sometimes added to the condition that the speed is 0 km/h and the brake pedal is held down.

When the driver's foot was taken off the brake pedal in the economy running state and therefore, the engine automatic start condition became satisfied, the engine was automatically started. Here, the engine automatic start condition is not limited to that. A condition that a gear is operated is sometimes added to the condition that the brake pedal is not held down.

By the way, since an alternator whose drive source is the engine does not generate electric power in the economy running state, a power supply to electrical components mounted on the vehicle is conducted only with electric power from a battery. If this situation is continued for a long period, there is a risk that the battery may be excessively consumed and that the battery degradation speed may become higher.

In order to solve this problem, various techniques have been proposed. For example, the below-mentioned Patent Document 1 discloses a technique, wherein when a vehicle is turned to an economy running state, feed to head lamps, an air conditioner and an audio system are forcefully cut off so as to reduce a load on a battery. The Patent Document 2 discloses a technique, wherein when a vehicle is in an economy running state, a situation where there is a large difference between a pre-selected temperature of an air conditioner and an actual ambient temperature is changed to a situation where there is a small difference therebetween so as to reduce a load on a battery.

However, in the technique disclosed in the Patent Document 1, when the vehicle is turned to the economy running state, the feed to the head lamps, the air conditioner and the audio system are forcefully cut off without consideration of a user's intention or an external environment. As a result, there is a risk that an event where feed is cut off with undesired timing may be caused, leading to user discomfort. In the technique disclosed in the Patent Document 2, feed is not cut off, but there is a risk that processing for reducing a load on the battery may be conducted with undesired timing, leading to user discomfort.

[Patent Document 1] Japanese Patent Application Laid-Open Publication No. 2001-341596

[Patent Document 2] Japanese Patent Application Laid-Open Publication No. 2002-331825

SUMMARY OF THE INVENTION

The present invention was accomplished in order to solve the above problem, and it is an object of the present invention to provide a feed limiting device and a control device, which lessen user discomfort and prevent excessive consumption of a battery.

In order to achieve the above object, a feed limiting device according to a first aspect of the present invention is characterized by being a feed limiting device for limiting feed to electrical components mounted on a vehicle in an economy running state. In other words, the electrical feed to the electrical components is limited to a level below the "ordinary" level of electrical feed, in which the "ordinary" level is the level of electrical feed to operate the electrical components when a feed limiting condition has not been met. The device includes a condition satisfaction judging unit for judging whether the feed limiting condition for limiting the feed to the electrical components has been satisfied or not, and a load control unit for limiting the feed to the electrical components by controlling each load of the electrical components based on an external environment and operating statuses of the electrical components when it is judged that the feed limiting condition has been satisfied by the condition satisfaction judging unit. The feed limiting condition includes that the vehicle is in the economy running state, and the load control unit does not limit (interrupts the limiting of) the loads of the electrical components to which it was judged that the present feed had to be maintained.

By using the feed limiting device according to the first aspect of the present invention, feed to electrical components (such as an air conditioner, an audio system and lamps) is limited when it is judged determined that a feed limiting condition for limiting the feed to the electrical components has been satisfied. In addition, the feed limiting condition includes that the vehicle is in the economy running state. Thus, in the economy running state, it is possible to reduce an amount of used electricity of a battery as required and to prevent consumption of the battery from excessively progressing.

Moreover, limitations on feed to the electrical components are conducted by controlling the loads thereof. For example, by changing a pre-selected temperature of an air conditioner, changing the volume of an audio system and switching lamps off, feed to the electrical components is limited. How the loads of the electrical components are to be controlled is determined based on the external environment and the operating statuses of the electrical components.

As a result, since the feed to the electrical components is limited based on the external environment and the operating statuses of the electrical components, it is possible to prevent the feed from being limited more than necessary. For example, the loads of the electrical components to which it was judged that the present feed had to be maintained are not limited. Thus, since the loads of the electrical components are properly limited, it is possible not only to prevent excessive consumption of the battery but also to lessen user discomfort. Here, as the external environment, an outside air temperature, a room temperature and an illumination are exemplified. As the operating statuses of the electrical components, an operating level (e.g. a pre-selected temperature of an air conditioner) and an amount of electricity consumed are exemplified.

In the feed limiting device according to the first aspect of the present invention, the load control unit may stop feed to the electrical components to which it was judged that no feed was required. Since the feed to the electrical components to which it was judged that no feed was required are stopped owing to this construction, it is possible to reduce a load on the battery so as to reduce the amount of used electricity of the battery to a minimum. Here, as a method of stopping feed to the electrical components, a method wherein current-carrying lines for supplying electric power to the electrical components concerned are shut off, and a method wherein an instruction to stop the operation is sent to control devices for controlling the electrical components concerned are exemplified.

A feed limiting device according to a second aspect of the present invention is characterized by the load control unit which determines contents of load limitations on the electrical components to which it was judged that the present feed did not have to be maintained or that no feed was required, and limits the loads of the electrical components based on the determined contents of load limitations in the feed limiting device according to the first aspect of the present invention.

No limitation on the loads of the electrical components to which the present feed should be maintained may be conducted and the feed to the electrical components to which no feed is required may be stopped. Therefore, the electrical components on which the contents of load limitations should be examined are those to which the present feed should not be maintained or no feed is required.

When the feed limiting device according to the second aspect of the present invention is used, the contents of load limitations on the electrical components to which it was judged that the present feed did not have to be maintained or that no feed was required are determined, and based on the determined contents of load limitations, the loads of the electrical components are limited. As a result, processing for determining the contents of load limitations and load limiting processing can be reduced to the minimum necessary, resulting in a reduction of the load of processing and an improvement in processing efficiency.

The feed limiting device according to the first or second aspect of the present invention may comprise an information unit for informing a user that the loads of the electrical components were limited.

The above-described limitations on the loads of the electrical components are not conducted with the user's intention. Therefore, if a temperature of 25° C. selected by the user was automatically changed to 26. ° C., for example, there is a risk that the user may uncertainly think that the air conditioner might suffer a failure. By informing the user that the load of the electrical component was limited, it is possible to prevent the user from having such uncertain feeling.

A feed limiting device according to a third aspect of the present invention is characterized by comprising a storage unit for storing statuses of the electrical components before the load limitations in the feed limiting device according to the first or second aspect of the present invention.

When the feed limiting device according to the third aspect of the present invention is used, the statuses of the electrical components before the load limitations are stored. Therefore, it is possible to easily return the electrical components to the statuses thereof before the load limitations.

A feed limiting device according to a fourth aspect of the present invention is characterized by comprising a cancel condition satisfaction judging unit for judging whether a cancel condition of feed limitations has been satisfied or not, and a return control unit for controlling to return each electrical component to the status of the electrical component before the load limitation when it is judged that the cancel condition of feed limitations has been satisfied by the cancel condition satisfaction judging unit in the feed limiting device according to the third aspect of the present invention.

When the feed limiting device according to the fourth aspect of the present invention is used, it is possible to automatically return the electrical components to the statuses thereof before the load limitations with appropriate timing.

A feed limiting device according to a fifth aspect of the present invention is characterized by being a feed limiting device for limiting feed to electrical components mounted on a vehicle in an economy running state. The device includes a condition satisfaction judging unit for judging whether a feed limiting condition for limiting the feed to the electrical components has been satisfied or not, and a notifying unit for notifying each control device for controlling the electrical components of the satisfaction of the feed limiting condition when it is judged that the feed limiting condition has been satisfied by the condition satisfaction judging unit, wherein the feed limiting condition includes that the vehicle is in the economy running state.

By using the feed limiting device according to the fifth aspect of the present invention, the notice of satisfaction of the feed limiting condition is sent to each control device (e.g. ECU) for controlling electrical components (such as an air conditioner, an audio system and lamps) when it is judged that the feed limiting condition for limiting the feed to the electrical components has been satisfied. Therefore, the load of an electrical component to be controlled by each control device can be limited in accordance with its own judgment. In addition, the feed limiting condition includes that the vehicle is in the economy running state. Thus, in the economy running state, it is possible to reduce an amount of used electricity of a battery as required and to prevent consumption of the battery from excessively progressing.

Though the feed limiting condition includes that the vehicle is in the economy running state, to be in the economy running state does not automatically mean that the feed limiting condition is satisfied. In other words, even if the vehicle is in the economy running state, the feed limiting condition is not satisfied (i.e., is interrupted) in some cases. Therefore, it is possible to prevent feed from being limited more than necessary in the economy running state. Thus, since the loads of the electrical components are properly limited, it is possible not only to prevent excessive consumption of the battery but also to lessen user discomfort. In addition, since it is not necessary for each control device to judge whether the feed limiting condition has been satisfied or not, the processing load on each control device can be reduced.

A feed limiting device according to a sixth aspect of the present invention is characterized by comprising an acquisition unit for acquiring external environment information. The notifying unit notifies each control device for controlling the electrical components of the external environment information acquired by the acquisition unit in the feed limiting device according to the fifth aspect of the present invention.

The control of loads of the electrical components can be more properly conducted with a consideration of the external environment. However, if each control device acquires the external environment information by itself, the processing load on each control device becomes heavy.

When the feed limiting device according to the sixth aspect of the present invention is used, the external environment information is acquired, and the acquired external environment information is provided to each control device for controlling the electrical components. Thus, since each control device need not acquire the external environment information by itself, the load of processing on each control device can be reduced.

A feed limiting device according to a seventh aspect of the present invention is characterized by comprising a continuation judging unit for judging whether the economy running state will be continued for a prescribed time or more. The feed limiting condition includes that it is judged that the economy running state will be continued for the prescribed time or longer by the continuation judging unit in any one of the feed limiting devices according to the first to sixth aspects of the present invention.

When the continuation time of the economy running state is too short, for example, when the above-described feed limitations are conducted in the economy running state of a few seconds or so, there is a possibility that an effect of restricting the progress of consumption of the battery may not be shown well.

When the feed limiting device according to the seventh aspect of the present invention is used, the feed limiting condition includes that it is judged that the economy running state will be continued for the prescribed time (e.g. 2 minutes) or more. Therefore, it is possible to prevent the above-described feed limitations from being conducted when the continuation time of the economy running state is too short. As a result, it is possible to reduce occasions where a user feels discomfort. Here, whether the economy running state will be continued for the prescribed time or more can be judged from a stopping place or a waiting time for a green signal.

When the vehicle is stopped at a parking lot of a convenience store, it is considered that the vehicle is parked for shopping, and it can be judged that the economy running state will continue for several minutes or more. The signal waiting time information can be acquired by developing an infrastructure such as a traffic information network.

A feed limiting device according to an eighth aspect of the present invention is characterized by comprising a consumption status judging unit for judging whether an amount of electricity consumed by the electrical components mounted on the vehicle is a prescribed value or more. The feed limiting condition includes that it is judged that the amount of electricity consumed by the electrical components is the prescribed value or more by the consumption status judging unit in any one of the feed limiting devices according to the first to seventh aspects of the present invention.

Even when the vehicle is in the economy running state, an alternator whose drive source is an engine is not generating electric power and therefore, only electric power from the battery is supplied to the electrical components, there is a low risk that consumption of the battery may excessively progress if the amount of electricity consumed by the electrical components is not large. In other words, if the amount of electricity consumed by the electrical components is not large, there is no problem without conducting feed limitations on the electrical components.

When the feed limiting device according to the eighth aspect of the present invention is used, the feed limiting condition includes that it is judged that the amount of electricity consumed by the electrical components is the prescribed value or more. Therefore, when the amount of electricity consumed by the electrical components is small (i.e. there is a low risk that consumption of the battery may excessively progress), it is possible to prevent the above-described feed limitations from being conducted. As a result, it is possible to reduce occasions where a user feels discomfort.

A feed limiting device according to a ninth aspect of the present invention is characterized by comprising a setting unit for setting the prescribed value based on a battery condition, wherein the consumption status judging unit makes the judgment based on the prescribed value set by the setting unit in the feed limiting device according to the eighth aspect of the present invention.

As described above, even when the vehicle is in the economy running state, an alternator whose drive source is an engine is not generating electric power and therefore, only electric power from the battery is supplied to the electrical components, there is a low risk that consumption of the battery may excessively progress if the amount of electricity consumed by the electrical components is not large.

However, under the same conditions of amount of electricity consumed by the electrical components, if a battery charging rate is high, consumption of the battery does not excessively progress, but if the battery charging rate is low, there is a risk that consumption of the battery may excessively progress. Thus, it is considered that the battery condition influences on a consumption speed.

When the feed limiting device according to the ninth aspect of the present invention is used, it is possible to more properly judge whether feed to the electrical components should be limited or not since the prescribed value is set based on the battery condition. Therefore, it is possible to conduct the limitations in cases where feed need be limited, while it is possible not to conduct the limitations in cases where feed need not be limited.

A feed limiting device according to a tenth aspect of the present invention is characterized by the feed limitations which are preferentially imposed on the electrical components having no relation with continuation of the economy running state in any one of the feed limiting devices according to the first to ninth aspects of the present invention.

It is important to limit feed to the electrical components in order to prevent excessive consumption of the battery, but it is not so preferable to limit feed in such a manner to influence continuation of the economy running state.

When the feed limiting device according to the tenth aspect of the present invention is used, it is possible to prevent feed limitations from having an adverse effect on continuation of the economy running state since the feed limitations are preferentially conducted on the electrical components having no relation with continuation of the economy running state.

A control device according to a first aspect of the present invention is characterized by being a control device for controlling an electrical component mounted on a vehicle. The device includes a load control unit for limiting a feed to the electrical component by controlling a load of the electrical component based on an external environment and an operating status of the electrical component when receiving a notification that a feed limiting condition for limiting the feed to the electrical component has been satisfied. The feed limiting condition includes that the vehicle is in an economy running state and the load control unit does not limit the load of the electrical component when it was judged that the present feed had to be maintained.

When the control device according to the first aspect of the present invention is used, a feed to an electrical component (e.g. an air conditioner, an audio system or lamps) is limited when a notification that a feed limiting condition for limiting the feed to the electrical component has been satisfied was received. Moreover, the feed limiting condition includes that the vehicle is in the economy running state. Thus, it is possible to reduce an amount of used electricity of a battery as required in the economy running state and to prevent consumption of the battery from excessively progressing.

A limitation on a feed to the electrical component is conducted by controlling the load thereof. For example, by changing a pre-selected temperature of an air conditioner, changing the volume of an audio system, or switching lamps off, a feed to the electrical component is limited. How the load of the electrical component is to be controlled is determined based on the external environment and the operating status of the electrical component.

As a result, since the limitation on the feed to the electrical component is conducted based on the external environment and the operating status of the electrical component, it is possible to prevent the feed from being limited more than necessary. For example, when it was judged that the present feed to an electrical component had to be maintained, the load of the electrical component is not limited. Thus, since the limitation on the load of the electrical component is properly conducted, it is possible not only to prevent excessive consumption of the battery but also to lessen user discomfort. Here, as the external environment, an outside air temperature, a room temperature and an illumination are exemplified. As the operating status of the electrical component, an operating level (e.g. a pre-selected temperature of an air conditioner) and an amount of electricity consumed are exemplified. Moreover, since this control device need not judge whether the feed limiting condition has been satisfied or not, the load of processing can be reduced.

A control device according to a second aspect of the present invention is characterized by the load control unit which stops the feed to the electrical component when it was judged that no feed was required in the control device according to the first aspect of the present invention.

When the control device according to the second aspect of the present invention is used, it is possible to reduce a load on the battery and to reduce the amount of used electricity of the battery to a minimum, since the feed to the electrical component to be controlled is stopped when it was judged that no feed was required. Here, as a method of stopping a feed to the electrical component, a method wherein a current-carrying line for supplying electric power to the electrical component concerned is shut off, and a method wherein the operation is stopped are exemplified.

A control device according to a third aspect of the present invention is characterized by the load control unit which determines a content of load limitation on the electrical component when it was judged that the present feed did not have to be maintained or that no feed was required. The device limits the load of the electrical component based on the determined content of load limitation in the control device according to the first or second aspect of the present invention.

No limitation on the load of the electrical component to which the present feed should be maintained may be conducted, and the feed to the electrical component to which no feed is required may be stopped. As a result, the electrical components on which the contents of load limitations should be examined are those to which the present feed should not be maintained or that no feed is required.

When the control device according to the third aspect of the present invention is used, the content of load limitation on the electrical component to be controlled is determined when it was judged that the electrical component concerned was one to which neither the present feed had to be maintained nor no feed was required. Based on the determined content of load limitation, the load of the electrical component is limited. As a result, it is possible to reduce processing for determining the content of load limitation and load limiting processing to the minimum necessary, resulting in a reduction of the load of processing and an improvement in processing efficiency.

Any one of the control devices according to the first to third aspects of the present invention may comprise an information unit for informing a user that the load of the electrical component was limited.

The above-described limitation on the load of the electrical component is not conducted with the user's intention. Therefore, if a temperature of 25° C. selected by the user was automatically changed to 26° C., for example, there is a risk that the user may uncertainly think that the air conditioner might suffer a failure. By informing the user that the load of the electrical component was limited, it is possible to prevent the user from having such uncertain feeling.

A control device according to a fourth aspect of the present invention is characterized by comprising a storage unit for storing a status of the electrical component before the load limitation in any one of the control devices according to the first to third aspects of the present invention.

When the control device according to the fourth aspect of the present invention is used, it is possible to easily return the electrical component to its status before the load limitation since the status of the electrical component before the load limitation is stored.

A control device according to a fifth aspect of the present invention is characterized by comprising a return control unit for controlling to return the electrical component to the status of the electrical component before the load limitation when receiving a notification that a cancel condition for canceling the feed limitation on the electrical component has been satisfied in the control device according to the fourth aspect of the present invention.

When the control device according to the fifth aspect of the present invention is used, it is possible to automatically return the electrical component to its status before the load limitation with appropriate timing.

DETAILED DESCRIPTION OF THE PREFERRED EMBODIMENTS

Figure 1:
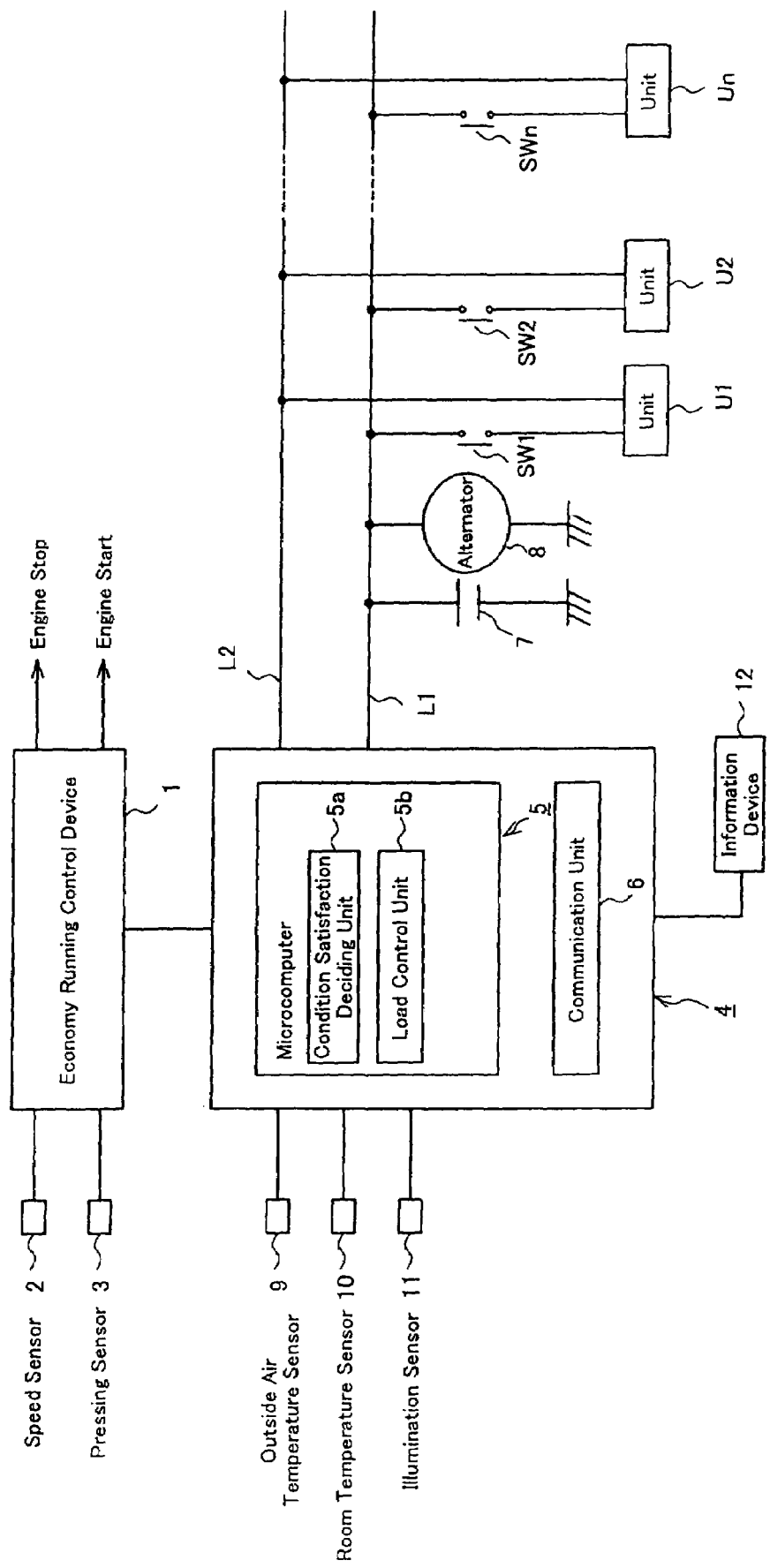
FIG. 1 is a block diagram schematically showing the principal part of a feed limiting system comprising a feed limiting device according to a first embodiment of the present invention.

The preferred embodiments of the feed limiting device and the control device according to the present invention are described below by reference to the Figures noted above. FIG. 1 is a block diagram schematically showing the principal part of a feed limiting system comprising a feed limiting device according to a first embodiment. Reference numeral 1 in FIG. 1 represents an economy running control device, to which a speed sensor 2 for detecting a speed of a vehicle and a pressing sensor 3 for detecting whether a brake pedal is held down or not are connected.

The economy running control device 1 outputs an engine stop signal to an engine control device (not shown) so as to cause an engine to automatically stop when it has been determined that an engine automatic stop condition has been satisfied, and starts the engine by activating a starter motor (not shown) when it has been determined that an engine automatic start condition has been satisfied. As the engine automatic stop condition, a condition that a vehicle is at a stop (the speed is 0 km/h) and a condition that the brake pedal is held down are exemplified. As the engine automatic start condition, a condition that the brake pedal is not held down is exemplified.

When the engine was automatically stopped, leading to an economy running state, the economy running control device 1 notifies a battery monitoring device 4 (corresponding to a feed limiting device according to the present invention) that the vehicle entered the economy running state. When the vehicle returned from the economy running state to its original state, the economy running control device 1 notifies the battery monitoring device 4 that the vehicle returned from the economy running state to its original state.

The battery monitoring device 4 comprises a microcomputer 5 and a communication unit 6 for conducting data communications with each kind of equipment. To the battery monitoring device 4, a power line L1 for supplying electric power sent from a battery 7 is connected. The microcomputer 5 comprises a feed limiting condition satisfaction deciding unit 5a and a load control unit 5b.

To the power line L1, not only the battery monitoring device 4 but also an alternator 8 and a plurality of units U1-Un through switches SW1-SWn are connected. The on-off control of the switches SW1-SWn is conducted by the battery monitoring device 4 (the microcomputer 5 thereof). Each of the units U1-Un comprises a microcomputer and a communication part which are not shown.

To the battery monitoring device 4, the units U1-Un are connected through a communication line L2, and therefore, the battery monitoring device 4 can send/receive data to/from the units U1-Un. For example, an instruction signal can be sent to the units U1-Un. When the units U1-Un receive the instruction signal, processing according to the instruction is conducted therein.

In addition, to the battery monitoring device 4, an outside air temperature sensor 9 for detecting an outside air temperature, a room temperature sensor 10 for detecting a temperature inside the vehicle, an illumination sensor 11 for detecting an illumination outside the vehicle and an information device 12 (e.g. an information lamp) are connected. Therefore, the battery monitoring device 4 can acquire outside air temperature information, room temperature information and outside illumination information from each of the sensors 9-11, and furthermore, can make information by using the information device 12.

The units U1-Un express electrical components such as an air conditioner, lamps and an audio system. From the units U1-Un, information indicating starting statuses or operating statuses of the air conditioner, the lamps, the audio system and the like is sent to the battery monitoring device 4. As the operating status of the air conditioner, operation modes (e.g. an air-cooling mode and a heating mode), a pre-selected temperature and the volume of air are exemplified. As the operating status of the lamps, kinds of lamps lit up (e.g. head lamps and clearance lamps) are exemplified. As the operating status of the audio system, a sound level is exemplified.

Figure 2:
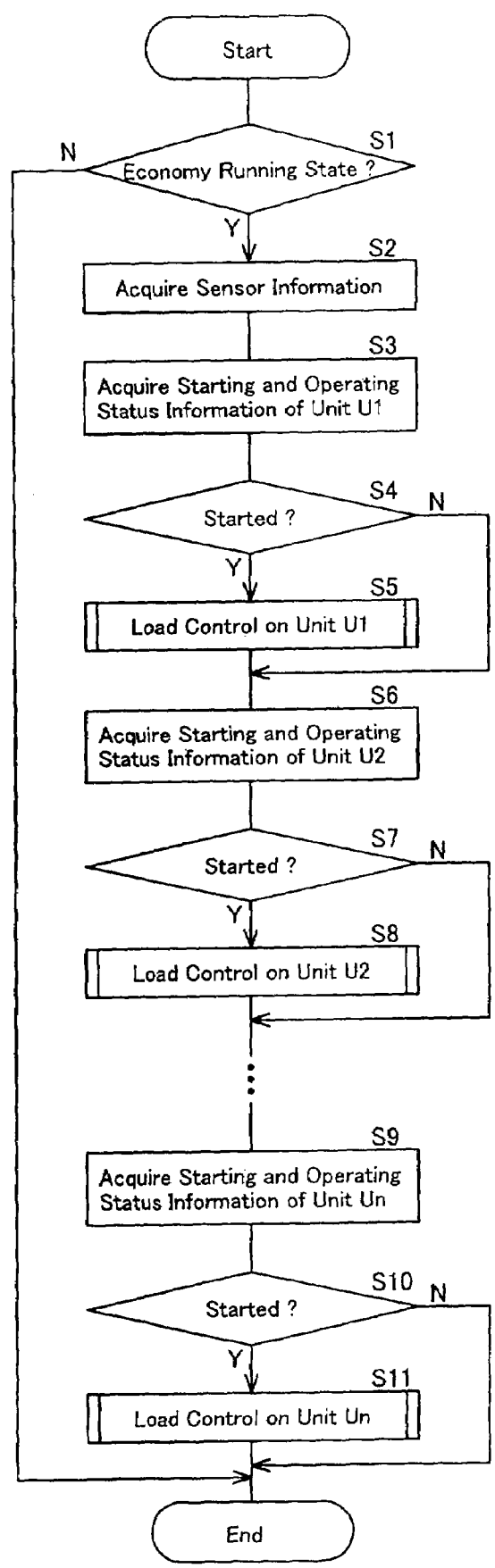
FIG. 2 is a flowchart showing a processing operation performed by a microcomputer in a battery monitoring device which constitutes the feed limiting system comprising the feed limiting device according to the first embodiment.

A processing operation [1-1] performed by the microcomputer 5 in the battery monitoring device 4 which constitutes the feed limiting system comprising the feed limiting device according to the first embodiment is described below with a flowchart shown in FIG. 2. Here, the processing operation [1-1] is conducted at every prescribed interval.

Whether the vehicle is in an economy running state or not is judged (determined) based on data sent from the economy running control device 1 (Step S1). When it is judged that the vehicle is in the economy running state, it is decided that a feed limiting condition to the units U1-Un has been satisfied, and external environment information is acquired from each of the sensors 9-11 (Step S2).

On the other hand, when it is judged that the vehicle is not in the economy running state, the processing operation [1-1] is concluded at once.

Data showing the starting status and operating status of the unit U1 is acquired (Step S3), and whether the unit U1 has been started or not is judged (Step S4). When it is judged that the unit U1 has been started, a feed to the unit U1 is limited by conducting 'load control' processing for controlling a load of the unit U1 (Step S5), and then, the operation goes to Step S6.

On the other hand, when it is judged that the unit U1 has not been started, the operation directly goes to Step S6, since the 'load control' processing for controlling a load of the unit U1 need not be conducted.

In Steps S6-S8, processing similar to that conducted on the unit U1 as shown in the above-described Steps S3-S5 (i.e. conducting the 'load control' for controlling a load if the unit is up) is conducted on the unit U2. Thereafter, the same processing is repeatedly conducted until conducted on the unit Un (Steps S9-S11).

Figure 3:
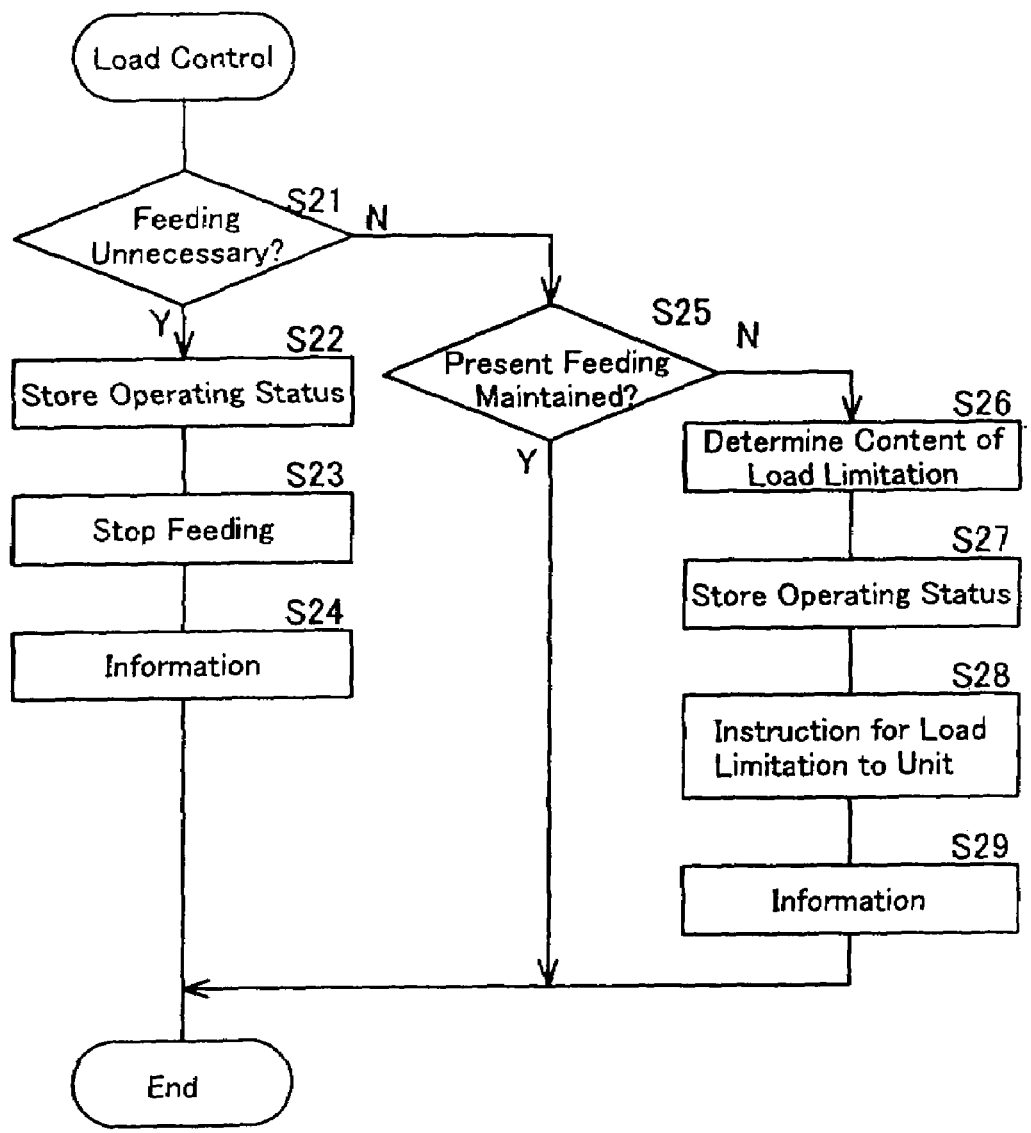
FIG. 3 is a flowchart showing a processing operation performed by the microcomputer in the battery monitoring device which constitutes the feed limiting system comprising the feed limiting device according to the first embodiment.

The processing operation 'load control' (Steps S5, S8 and S11 of FIG. 2) performed by the microcomputer 5 in the battery monitoring device 4 which constitutes the feed limiting system comprising the feed limiting device according to the first embodiment is described below with a flowchart shown in FIG. 3. Based on an external environment (e.g. an outside air temperature, a room temperature and an outside illumination) and an operating status of a unit Uk (k is any of 1-n), whether a feed to the unit Uk is unnecessary is determined (Step S21).

How to judge whether a feed to the unit Uk is unnecessary is concretely shown below.

1. When the outside air temperature and the pre-selected temperature of an air conditioner are the same or close to each other, air conditioning is unnecessary, and therefore, it is judged that a feed to the air conditioner is unnecessary.

2. When it is bright around the vehicle, lighting of head lamps and clearance lamps (side lights) is unnecessary, and therefore, it is judged that a feed to the head lamps and clearance lamps is unnecessary.

When it is judged that the feed to the unit Uk is unnecessary, the data showing the operating status of the unit Uk is stored in a memory (not shown) within the microcomputer 5 (Step S22), the feed to the unit Uk is stopped (Step S23), and then, by controlling the information device 12, a user is informed that the feed to the unit Uk has been limited (Step S24). As a method of stopping a feed to the unit Uk, a method wherein a switch SWk is opened, and a method wherein an instruction signal to stop starting is sent to the unit Uk so as to cause the unit Uk to stop starting are exemplified.

On the other hand, when it is judged that the feed to the unit Uk is not unnecessary (i.e., is necessary) in Step S21, whether the feed to the unit Uk need be maintained as it is or not is judged (Step S25).

How to judge whether the feed to the unit Uk need be maintained as it is or not is concretely shown below.

1. When there is a large difference between the outside air temperature and the pre-selected temperature of an air conditioner, the operating status of the air conditioner should be preferably maintained as it is, and therefore, it is judged that the feed to the air conditioner need be maintained as it is.

2. When the outside illumination is a certain value or less and clearance lamps have been lit up but head lamps have not been lit up, the clearance lamps should be preferably kept as they stand, and therefore, it is judged that the feed to the lamps need be maintained as it is.

When it is judged that the feed to the unit Uk need be maintained as it is, the 'load control' processing is concluded at once. On the other hand, when it is judged that the feed to the unit Uk need not be maintained as it is, the content of load limitation on the unit Uk is determined based on the external environment and the operating status of the unit Uk (Step S26). Thereafter, the data showing the operating status of the unit Uk is stored in the memory within the microcomputer 5 (Step S27), and an instruction signal to limit the load to the determined content is sent to the unit Uk (Step S28). Then, by controlling the information device 12, the user is informed that the feed to the unit Uk has been limited (Step S29).

Concrete examples of the determined content of load limitation on the unit Uk are shown below.

1. Based on the outside air temperature, the room temperature, the operation mode and the pre-selected temperature of the air conditioner, an appropriate set temperature is obtained, and based on the obtained appropriate set temperature, the pre-selected temperature of the air conditioner is made higher or lower. In addition, the volume of air may be made lower.

2. When both the head lamps and the clearance lamps have been lit up, the head lamps are turned off.

3. The volume of the audio system is lowered.

Figure 4:
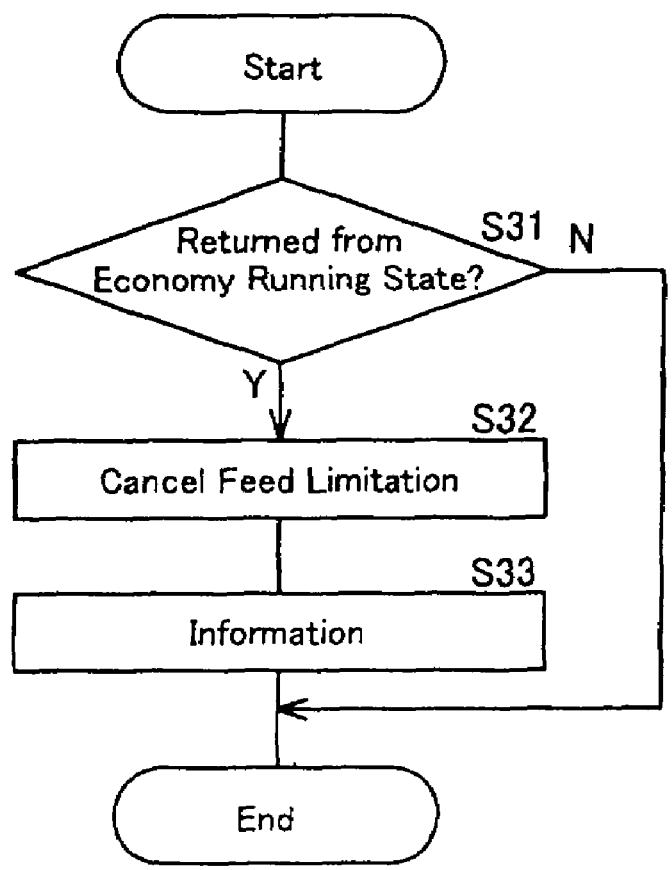
FIG. 4 is a flowchart showing a processing operation performed by the microcomputer in the battery monitoring device which constitutes the feed limiting system comprising the feed limiting device according to the first embodiment.

A processing operation [1-2] performed by the microcomputer 5 in the battery monitoring device 4 which constitutes the feed limiting system comprising the feed limiting device according to the first embodiment is described below with a flowchart shown in FIG. 4. Here, the processing operation [1-2] is conducted at every prescribed interval when a feed limiting condition has been satisfied.

Based on data sent from the economy running control device 1, whether the economy running state was cancelled or not is determined (Step S31). When it is judged that the economy running state was cancelled, it is decided that a cancel condition of feed limitations on the units U1-Un has been satisfied, and based on data showing the operating statuses of the units U1-Un before the feed limitations which have been stored in the memory, the feed limitations imposed on the units U1-Un are cancelled (Step S32). Thereafter, by controlling the information device 12, the user is informed that the feed limitations on the units U1-Un were cancelled (Step S33).

On the other hand, when it is judged that the economy running state has not been cancelled, the processing operation [1-2] is concluded at once.

When the feed limiting system comprising the feed limiting device according to the first embodiment is used, a feed to the unit Uk (e.g. an air conditioner, lamps or an audio system) is limited when it is judged that a feed limiting condition for limiting a feed to the unit Uk has been satisfied. In addition, the feed limiting condition includes that the vehicle is in an economy running state. Thus, when the vehicle is in the economy running state, it is possible to reduce the amount of used electricity of the battery 7 as required, resulting in prevention of excessive consumption of the battery 7.

The limitation on the feed to the unit Uk is conducted by controlling the load thereof. For example, by changing the pre-selected temperature of the air conditioner, switching the lamps off, or changing the volume of the audio system, the feed to the unit Uk is limited. The control content of the load of the unit Uk is determined based on the external environment and the operating status of the unit Uk.

As a result, since the limitation on the feed to the unit Uk is conducted based on the external environment and the operating status of the unit Uk, it is possible to prevent the feed from being limited more than necessary. For example, the load of the unit Uk to which it was judged that the present feed had to be maintained is not limited. Thus, since the limitation on the load of the unit Uk is properly conducted, it is possible not only to prevent excessive consumption of the battery 7 but also to lessen user discomfort.

Figure 5:
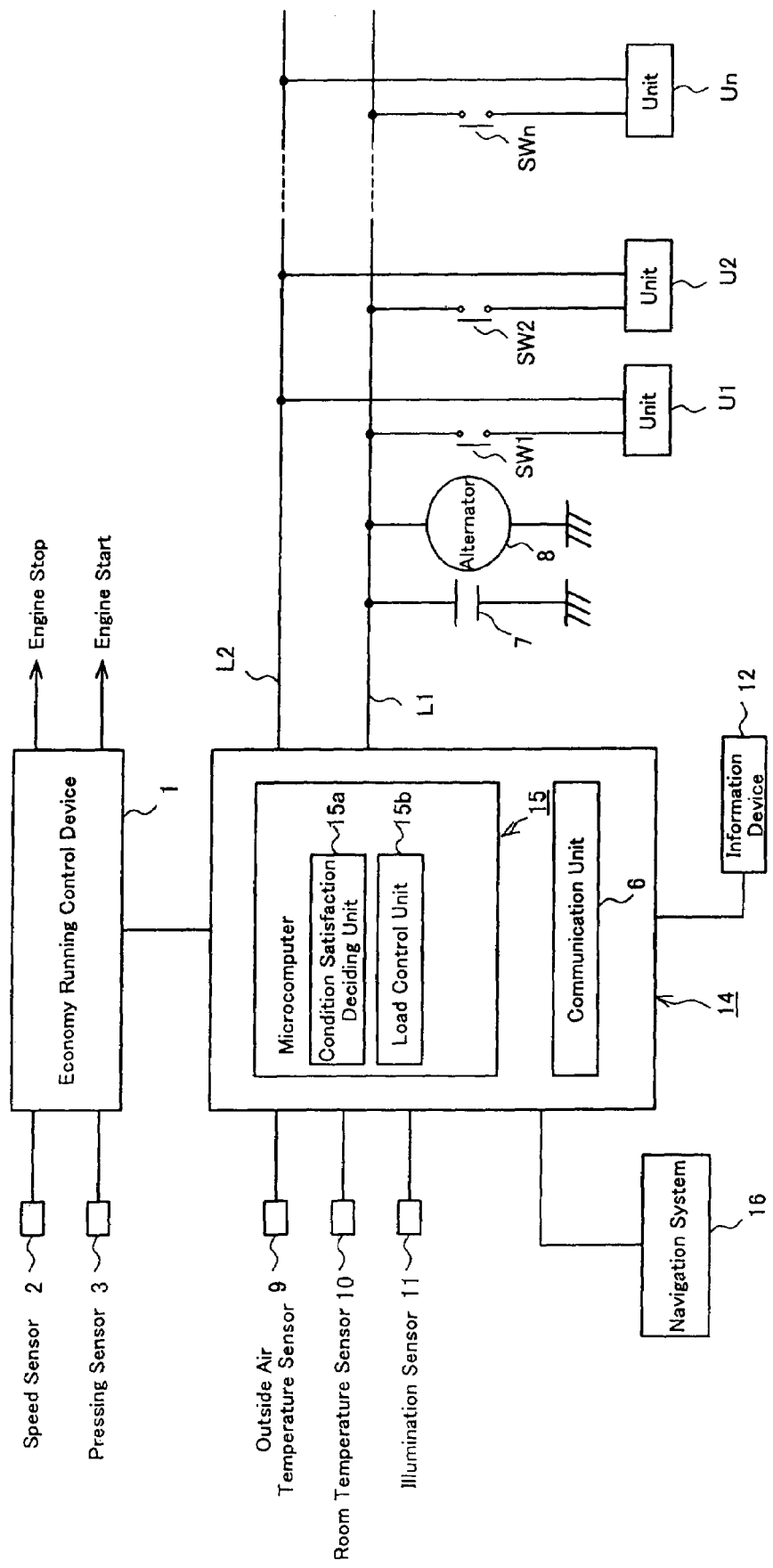
FIG. 5 is a block diagram schematically showing the principal part of a feed limiting system comprising a feed limiting device according to a second embodiment.

FIG. 5 is a block diagram schematically showing the principal part of a feed limiting system comprising a feed limiting device according to a second embodiment. Here, the same components as those of the feed limiting system shown in FIG. 1 are similarly marked and are not described below. Reference numeral 14 in FIG. 5 represents a battery monitoring device, comprising a microcomputer 15 and a communication unit 6 for conducting data communications with each kind of equipment. To the battery monitoring device 14, a power line L1 for supplying electric power sent from a battery 7 is connected. The microcomputer 15 comprises a feed limiting condition satisfaction deciding unit 15a and a load control unit 15b.

A navigation system 16 has a function of receiving radio beacons, light beacons and FM multiplex broadcasts. Therefore, the navigation system 16 can capture traffic jam information, traffic restriction information, signal waiting time information and the like, and sends the traffic jam information, the traffic restriction information, the signal waiting time information and position information to the battery monitoring device 14.

Figure 6:
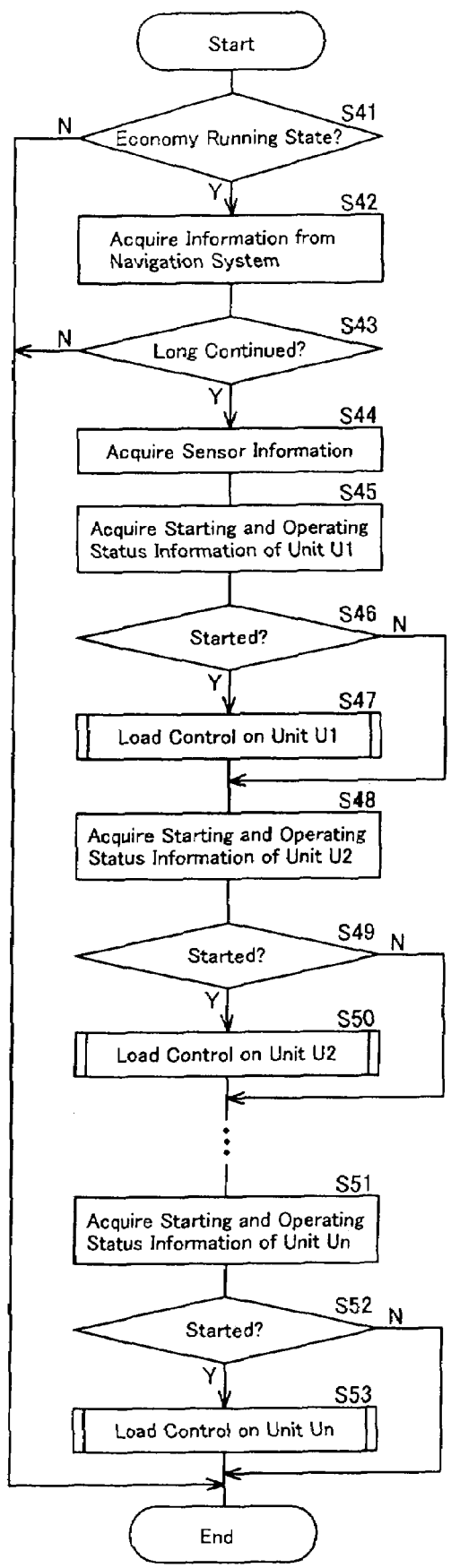
FIG. 6 is a flowchart showing a processing operation performed by a microcomputer in a battery monitoring device which constitutes the feed limiting system comprising the feed limiting device according to the second embodiment.

A processing operation [2-1] performed by the microcomputer 15 in the battery monitoring device 14 which constitutes the feed limiting system comprising the feed limiting device according to the second embodiment is described below with a flowchart shown in FIG. 6. Here, the processing operation [2-1] is conducted at every prescribed interval.

Whether the vehicle is in an economy running state or not is judged based on data sent from an economy running control device 1 (Step S41). When it is judged that the vehicle is in the economy running state, information used for a forecast for an economy running state continuation time is acquired from the navigation system 16 (Step S42). Based on the information obtained from the navigation system 16, whether or not the economy running state will be continued for a prescribed time T (e.g. 2 minutes) or more is judged (Step S43).

How to judge whether or not the economy running state will be continued for the prescribed time T or more is concretely shown below.

1. When the current position is at a parking lot of a convenience store, it is considered that the vehicle is parked for shopping, and therefore, it can be judged that the economy running state will continue for the prescribed time T or more.

2. When a signal waiting time is the prescribed time T or more, it can be judged that the economy running state will continue for the prescribed time T or more.

When it is judged that the economy running state will be continued for the prescribed time T or more, it is decided that a feed limiting condition to units U1-Un has been satisfied, and external environment information is acquired from each kind of sensors 9-11 (Step S44).

On the other hand, when it is judged that the vehicle is not in the economy running state in Step S41, or when it is judged that the economy running state will not be continued for the prescribed time T or more in Step S43, the processing operation [2-1] is concluded at once.

Data showing the starting status and operating status of the unit U1 is acquired (Step S45), and whether the unit U1 has been started or not is determined (Step S46). When it is judged that the unit U1 has been started, a feed to the unit U1 is limited by conducting 'load control' processing (see FIG. 3) for controlling a load of the unit U1 (Step S47), and then, the operation goes to Step S48.

On the other hand, when it is judged that the unit U1 has not been started, the operation directly goes to Step S48, since the 'load control' processing for controlling a load of the unit U1 need not be conducted.

In Steps S48-S50, processing similar to that conducted on the unit U1 as shown in the above-described Steps S45-S47 (i.e. conducting the 'load control' for controlling a load if the unit is up) is conducted on the unit U2. Thereafter, the same processing is repeatedly conducted until conducted on the unit Un (Steps S51-S53).

The microcomputer 15 in the battery monitoring device 14 which constitutes the feed limiting system comprising the feed limiting device according to the second embodiment performs a processing operation similar to the processing operation [1-2] (see FIG. 4) performed by the microcomputer 5 in the battery monitoring device 4 shown in FIG. 1.

When the feed limiting system comprising the feed limiting device according to the second embodiment is used, the feed limiting condition includes that it is judged that the economy running state will be continued for the prescribed time T or more. Therefore, when the economy running state continuation time is too short, it is possible to prevent feed limitations on the units U1-Un from being imposed. As a result, occasions where a user feels discomfort can be reduced.

Figure 7:
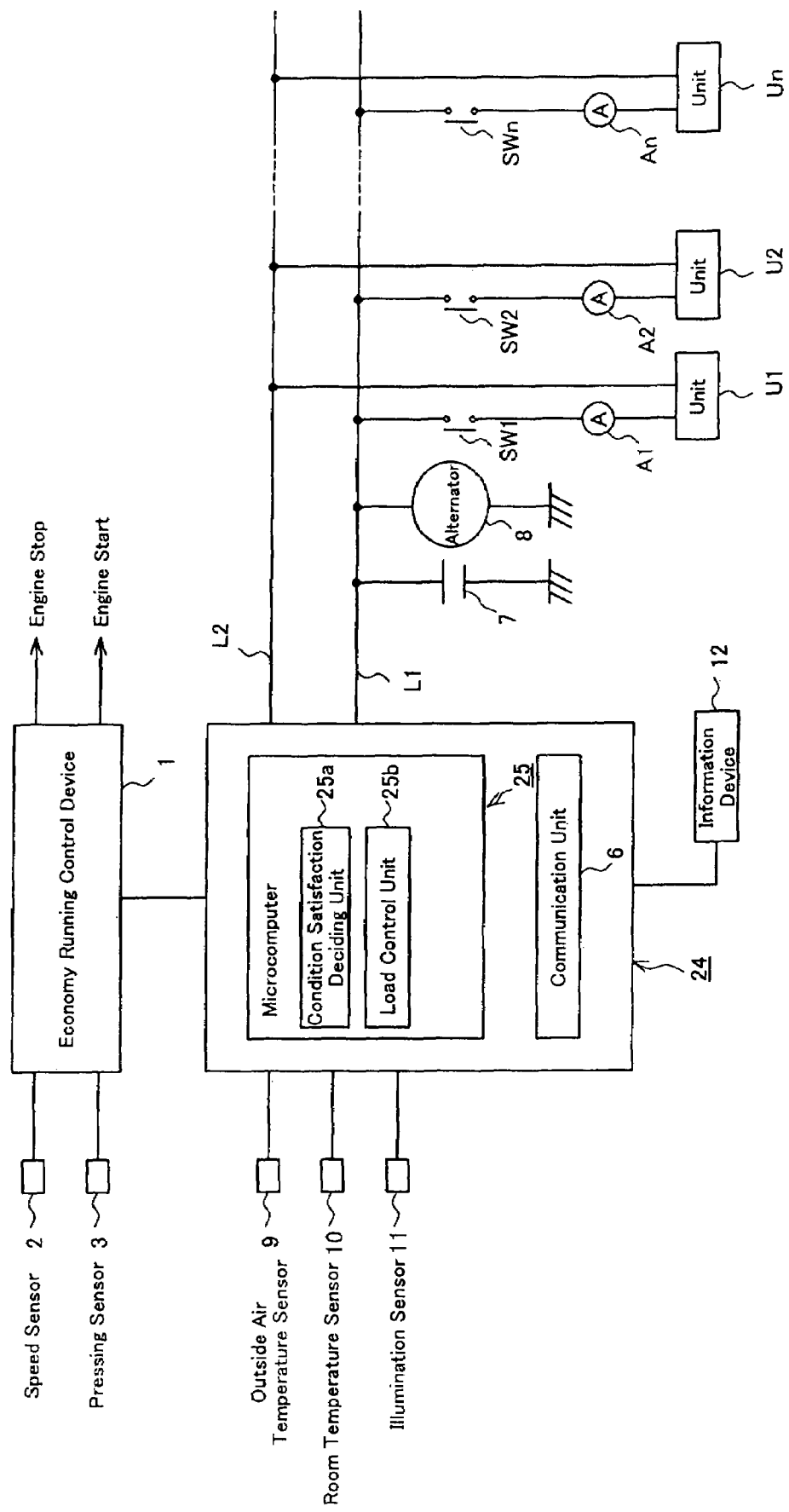
FIG. 7 is a block diagram schematically showing the principal part of a feed limiting system comprising a feed limiting device according to a third embodiment.

FIG. 7 is a block diagram schematically showing the principal part of a feed limiting system comprising a feed limiting device according to a third embodiment. Here, the same components as those of the feed limiting system shown in FIG. 1 are similarly marked and are not described below. Reference numeral 24 in FIG. 7 represents a battery monitoring device, comprising a microcomputer 25 and a communication unit 6 for conducting data communications with each kind of equipment. To the battery monitoring device 24, a power line L1 for supplying electric power sent from a battery 7 is connected. The microcomputer 25 comprises a feed limiting condition satisfaction deciding unit 25a and a load control unit 25b.

Current sensors A1-An are used for detecting amounts of electricity (load working current) consumed by units U1-Un. Though it is not shown, the current sensors A1-An are connected to the battery monitoring device 24, and the battery monitoring device 24 (the microcomputer 25 thereof) can grasp the amounts of electricity consumed by the units U1-Un.

Figure 8:
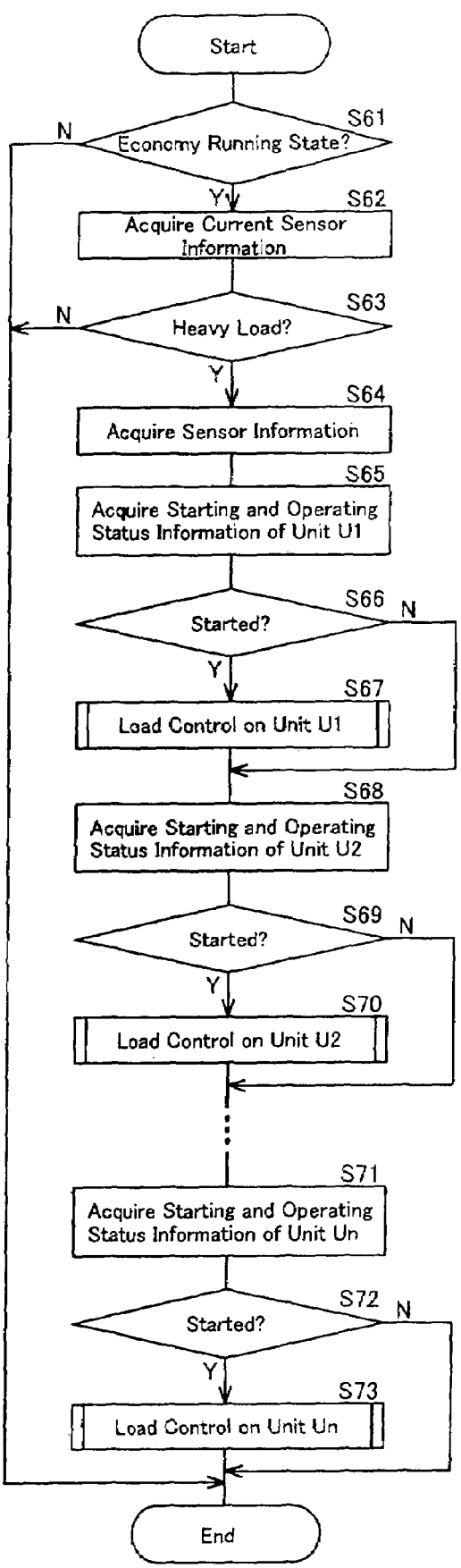
FIG. 8 is a flowchart showing a processing operation performed by a microcomputer in a battery monitoring device which constitutes the feed limiting system comprising the feed limiting device according to the third embodiment.

A processing operation [3-1] performed by the microcomputer 25 in the battery monitoring device 24 which constitutes the feed limiting system comprising the feed limiting device according to the third embodiment is described below with a flowchart shown in FIG. 8. Here, the processing operation [3-1] is conducted at every prescribed interval.

Whether a vehicle is in an economy running state or not is judged based on data sent from an economy running control device 1 (Step S61). When it is judged that the vehicle is in the economy running state, information used for judging 'a heavy load' is acquired from the current sensors A1-An (Step S62). Based on the data obtained from the current sensors A1-An, whether or not the amount of electricity consumed by the units U1-Un is a prescribed value I (e.g. 100A) or more is determined (Step S63).

When it is judged that the amount of electricity consumed by the units U1-Un is the prescribed value I or more, it is decided that a feed limiting condition to the units U1-Un has been satisfied, and external environment information is acquired from each kind of sensors 9-11 (Step S64).

On the other hand, when it is judged that the vehicle is not in the economy running state in Step S61, or when it is judged that the amount of electricity consumed by the units U1-Un is less than the prescribed value I in Step S63, the processing operation [3-1] is concluded at once.

Even if the vehicle is in the economy running state, an alternator 8 whose drive source is an engine is not generating power, and therefore, a power supply to the units U1-Un is conducted only with electricity from the battery 7, there is a low risk that the battery 7 may be excessively consumed when the amount of electricity consumed by the units U1-Un is not large. Therefore, when the amount of electricity consumed by the units U1-Un is less than the prescribed value I, the feed limiting condition is regarded as being unsatisfied and the processing operation [3-1] is concluded.

Data showing the starting status and operating status of the unit U1 is acquired (Step S65), and whether the unit U1 has been started or not is determined (Step S66). When it is judged that the unit U1 has been started, a feed to the unit U1 is limited by conducting 'load control' processing (see FIG. 3) for controlling a load of the unit U1 (Step S67), and then, the operation goes to Step S68.

On the other hand, when it is judged that the unit U1 has not been started, the operation directly goes to Step S68, since the 'load control' processing for controlling a load of the unit U1 need not be conducted.

In Steps S68-S70, processing similar to that conducted on the unit U1 as shown in the above-described Steps S65-S67 (i.e. conducting the 'load control' for controlling a load if the unit is up) is conducted on the unit U2. Thereafter, the same processing is repeatedly conducted until conducted on the unit Un (Steps S71-S73).

The microcomputer 25 in the battery monitoring device 24 which constitutes the feed limiting system comprising the feed limiting device according to the third embodiment performs a processing operation similar to the processing operation [1-2] (see FIG. 4) performed by the microcomputer 5 in the battery monitoring device 4 shown in FIG. 1.

When the feed limiting system comprising the feed limiting device according to the third embodiment is used, the feed limiting condition includes a determination of whether the amount of electricity consumed by the units U1-Un is the prescribed value I or more. Therefore, it is possible to prevent feed limitations on the units U1-Un from being imposed when the amount of electricity consumed by the units U1-Un is small (i.e. there is a low risk that the battery 7 may be excessively consumed). As a result, occasions where a user feels discomfort can be reduced.

By the way, as described above, even if the vehicle is in the economy running state, the alternator 8 whose drive source is the engine is not generating electric power, and therefore, a power supply to the units U1-Un is conducted only with electricity from the battery 7, there is a low risk that the battery 7 may be excessively consumed when the amount of electricity consumed by the units U1-Un is not large.

However, under the same conditions of amount of electricity consumed by the units U1-Un, if a charging rate SOC of the battery 7 is high, consumption of the battery 7 does not excessively progress. But if the charging rate SOC of the battery 7 is low, there is a risk that consumption of the battery 7 may excessively progress. Thus, it is considered that the condition of the battery has an influence on a consumption speed.

Then, in another embodiment, a prescribed value I may be set based on a battery condition (e.g. a battery charging rate SOC). For example, when the battery charging rate SOC is high, the prescribed value I is set to be small, and when the battery charging rate SOC is low, the prescribed value I is set to be large.

In the feed limiting systems comprising the feed limiting devices according to the first to third embodiments, the 'load control' processing for controlling the loads of the units U1-Un is conducted on the unit U1 to the unit Un in sequence. However, in another embodiment, if the amount of electricity consumed by the units U1-Un was reduced to a prescribed value or less in the middle of the 'load control' processing on the units U1-Un, the rest of the 'load control' processing may not be conducted. In still another embodiment, feed limitations may be imposed on units having no relation with continuation of an economy running state with first priority. For example, units U1-U3 on which load control is conducted first are set to be an air conditioner, lamps and an audio system.

Figure 9:
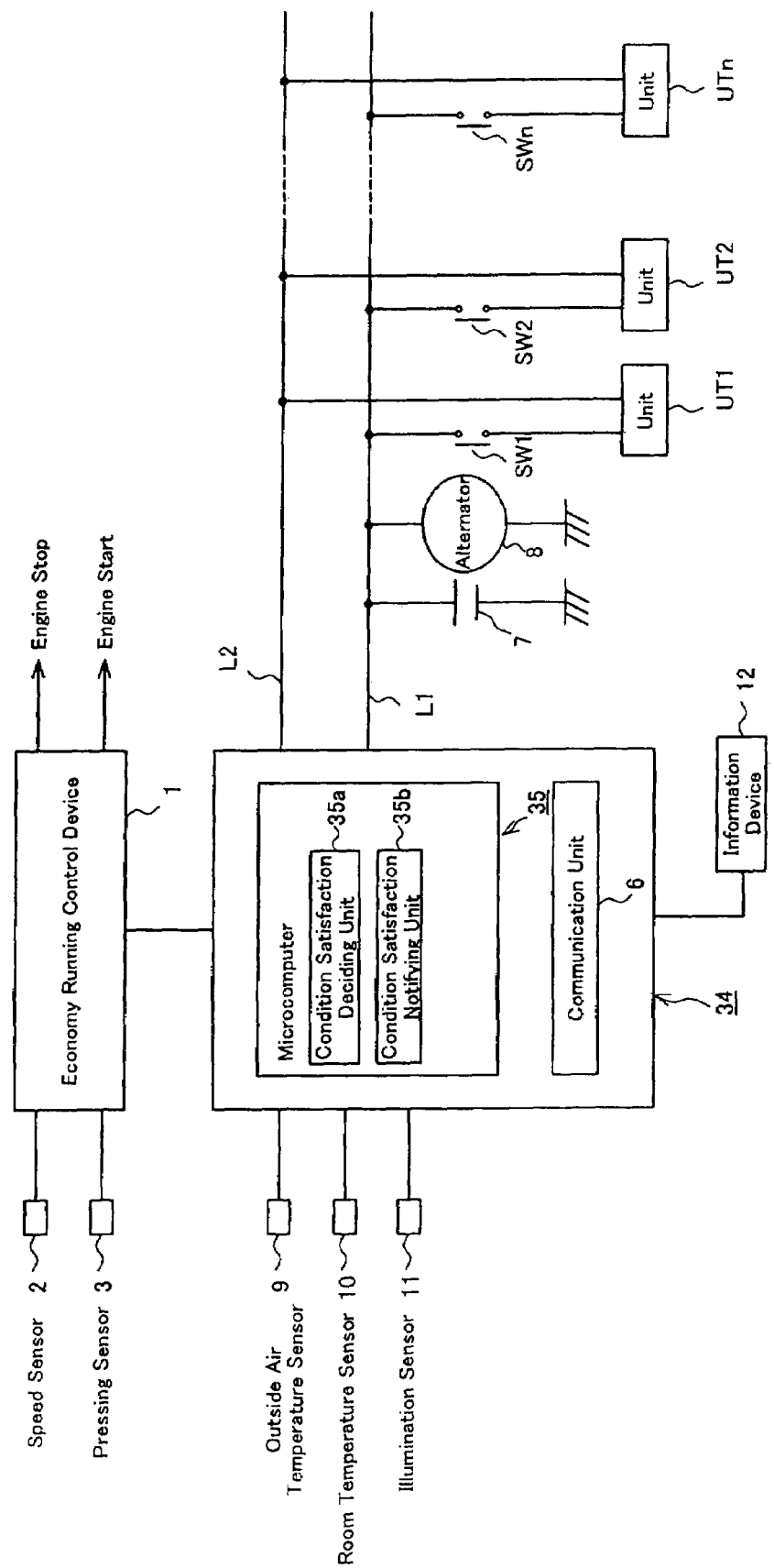
FIG. 9 is a block diagram schematically showing the principal part of a feed limiting system comprising a feed limiting device and control devices according to a fourth embodiment.

FIG. 9 is a block diagram schematically showing the principal part of a feed limiting system comprising a feed limiting device and control devices according to a fourth embodiment. Here, the same components as those of the feed limiting system shown in FIG. 1 are similarly marked and are not described below. Reference numeral 34 in FIG. 9 represents a battery monitoring device, comprising a microcomputer 35 and a communication unit 6 for conducting data communications with each kind of equipment. To the battery monitoring device 34, a power line L1 for supplying electric power sent from a battery 7 is connected. The microcomputer 35 comprises a feed limiting condition satisfaction deciding unit 35a and a feed limiting condition satisfaction notifying unit 35b for notifying the below-described units UT1-UTn (corresponding to control devices according to the present invention) that a feed limiting condition has been satisfied.

To the power line L1, not only the battery monitoring unit 34 but also an alternator 8 and a plurality of units UT1-UTn through switches SW1-SWn are connected. The on-off control of the switches SW1-SWn is conducted by the battery monitoring device 34 (the microcomputer 35 thereof) or each of the units UT1-UTn. Each of the units UT1-UTn comprises a microcomputer and a communication part which are not shown.

The battery monitoring device 34, to which the units UT1-UTn are connected through a communication line L2, can send/receive data to/from the units UT1-UTn. For example, an instruction signal can be sent to the units UT1-UTn. When receiving the instruction signal, the units UT1-UTn conduct processing according to the instruction.

The units UT1-UTn express electrical components such as an air conditioner, lamps and an audio system. From the units UT1-UTn, information showing starting statuses or operating statuses of the air conditioner, the lamps, the audio system and the like is sent to the battery monitoring device 34. As the operating status of the air conditioner, an operation mode (e.g. an air-cooling mode and a heating mode), a pre-selected temperature and the volume of air are exemplified. As the operating status of the lamps, kinds of lamps lit up (e.g. head lamps and clearance lamps) are exemplified. As the operating status of the audio system, a sound level is exemplified.

Figure 10:
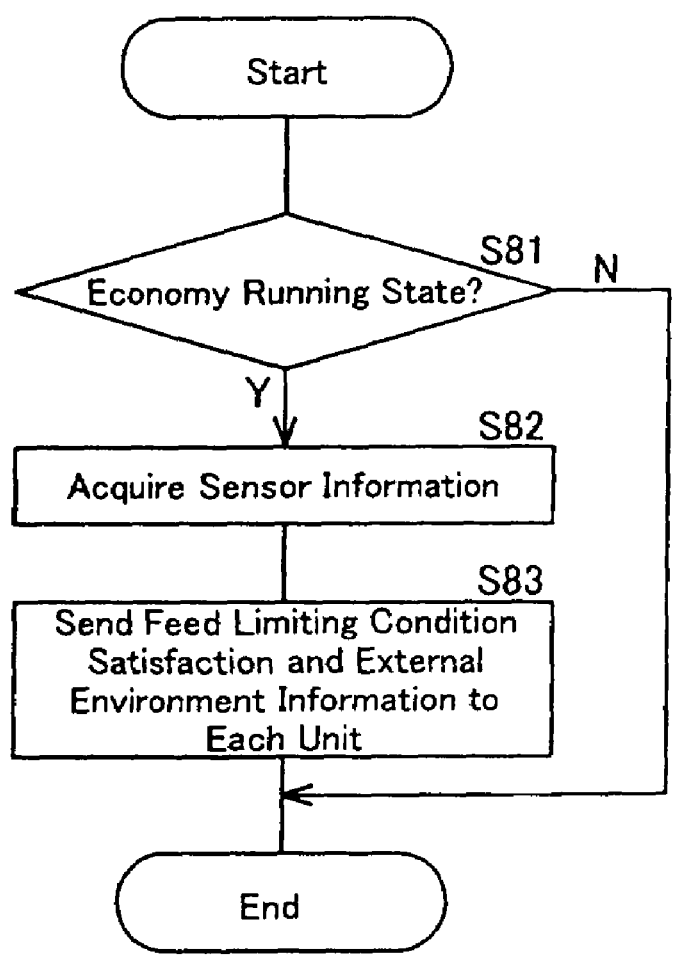
FIG. 10 is a flowchart showing a processing operation performed by a microcomputer in a battery monitoring device which constitutes the feed limiting system comprising the feed limiting device and the control devices according to the fourth embodiment.

A processing operation [4-1] performed by the microcomputer 35 in the battery monitoring device 34 which constitutes the feed limiting system comprising the feed limiting device and the control devices according to the fourth embodiment is described below with a flowchart shown in FIG. 10. Here, the processing operation [4-1] is conducted at every prescribed interval.

Whether the vehicle is in an economy running state or not is judged based on data sent from an economy running control device 1 (Step S81). When it is judged that the vehicle is in the economy running state, it is decided that a feed limiting condition to the units UT1-UTn has been satisfied, and external environment information is acquired from each kind of sensor 9-11 (Step S82). Thereafter, a notification that the feed limiting condition has been satisfied and the external environment information are sent to the units UT1-UTn (Step S83).

On the other hand, when it is judged that the vehicle is not in the economy running state, the processing operation [4-1] is concluded at once.

Figure 11:
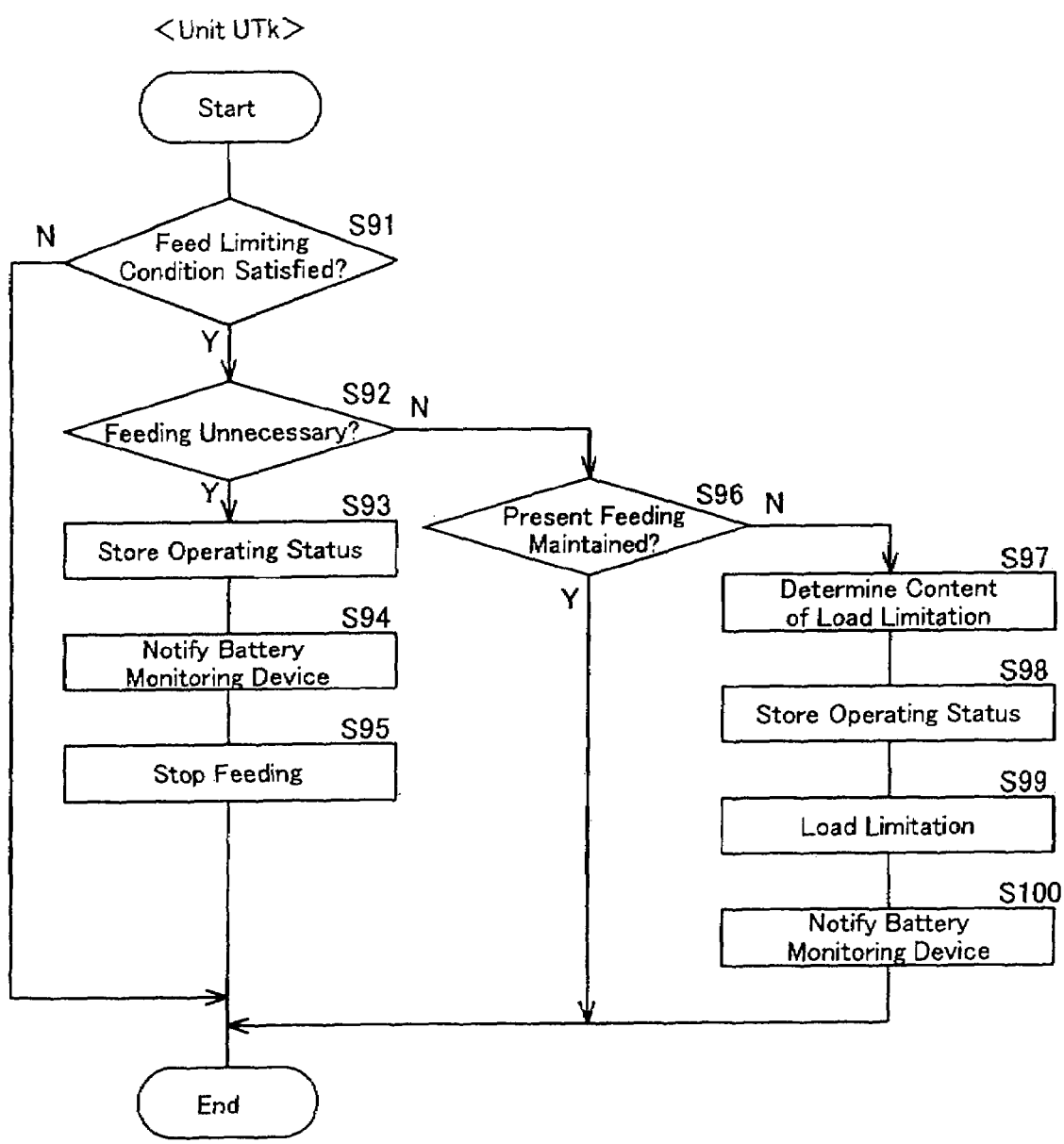
FIG. 11 is a flowchart showing a processing operation performed by a microcomputer in a unit which constitutes the feed limiting system comprising the feed limiting device and the control devices according to the fourth embodiment.

A processing operation [4-2] performed by a microcomputer in a unit UTk (k is any of 1-n) which constitutes the feed limiting system comprising the feed limiting device and the control devices according to the fourth embodiment is described below with a flowchart shown in FIG. 11. Here, the processing operation [4-2] is conducted at every prescribed interval.

Based on information sent from the battery monitoring device 34, whether a feed limiting condition to the unit UTk has been satisfied or not is judged (Step S91). When it is judged that the feed limiting condition has been satisfied, whether a feed to the unit UTk is unnecessary or not is judged based on the external environment information (e.g. an outside air temperature, a room temperature and an outside illumination) sent from the battery monitoring device 34 and an operating status of the unit UTk (Step S92).

How to judge whether a feed to the unit UTk is unnecessary or not is concretely shown below.

1. When the outside air temperature and the pre-selected temperature of an air conditioner are the same or close to each other, air conditioning is unnecessary, and therefore, it is judged that a feed to the air conditioner is unnecessary.

2. When it is bright around the vehicle, lighting of head lamps and clearance lamps (side lights) is unnecessary, and therefore, it is judged that a feed to the head lamps and clearance lamps is unnecessary.

When it is judged that the feed to the unit UTk is unnecessary, the data showing the operating status of the unit UTk is stored in a memory (not shown) within the microcomputer (Step S93), a notification of the stop of operation of the unit UTk is sent to the battery monitoring device 34 (Step S94), and then, the operation of the unit UTk is stopped (Step S95). As a method of stopping operation of the unit UTk, not only a method wherein the unit UTk is simply off-controlled, but also a method wherein a switch SWk is opened are exemplified.

On the other hand, when it is judged that the feed to the unit UTk is not unnecessary in Step S92, whether the feed to the unit UTk need be maintained as it is or not is determined (Step S96).

How to judge whether the feed to the unit UTk need be maintained as it is or not is concretely shown below.

1. When there is a large difference between the outside air temperature and the pre-selected temperature of an air conditioner, the operating status of the air conditioner should be preferably maintained as it is, and therefore, it is judged that the feed to the air conditioner need be maintained as it is.

2. When the outside illumination is a certain value or less and clearance lamps have been lit up but head lamps have not been lit up, the clearance lamps should be preferably kept as they stand, and therefore, it is judged that the feed to the lamps need be maintained as it is.

When it is judged that the feed to the unit UTk need be maintained as it is, the processing operation [4-2] is concluded at once. On the other hand, when it is judged that the feed to the unit UTk need not be maintained as it is, the content of load limitation on the unit UTk is determined based on the external environment and the operating status of the unit UTk (Step S97). Thereafter, the data showing the operating status of the unit UTk is stored in the memory within the microcomputer (Step S98), and the load is controlled to the determined content (Step S99). Then, the battery monitoring device 34 is notified that the load was limited (Step S100).

Concrete examples of the determined content of load limitation on the unit UTk are shown below.

1. Based on the outside air temperature, the room temperature, the operation mode and the pre-selected temperature of the air conditioner, an appropriate set temperature is obtained, and based on the obtained appropriate set temperature, the pre-selected temperature of the air conditioner is made higher or lower. In addition, the volume of air may be made lower.

2. When both the head lamps and the clearance lamps have been lit up, the head lamps are turned off.

3. The volume of the audio system is lowered.

Figure 12:
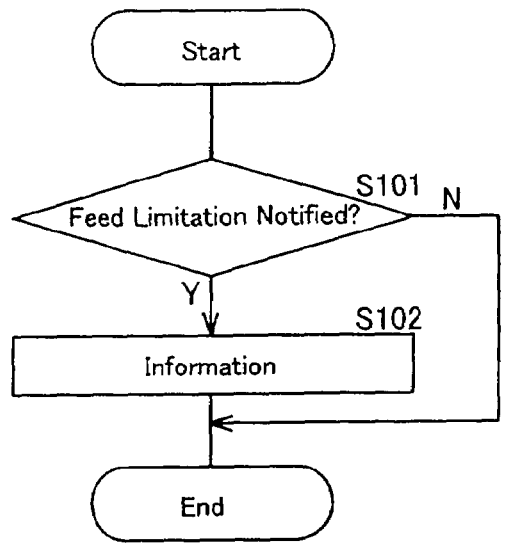
FIG. 12 is a flowchart showing a processing operation performed by the microcomputer in the battery monitoring device which constitutes the feed limiting system comprising the feed limiting device and the control devices according to the fourth embodiment.

A processing operation [4-3] performed by the microcomputer 35 in the battery monitoring device 34 which constitutes the feed limiting system comprising the feed limiting device and the control devices according to the fourth embodiment is described below with reference to a flowchart shown in FIG. 12. Here, the processing operation [4-3] is conducted at every prescribed interval when a feed limiting condition has been satisfied.

Whether a notification that a feed was limited was received from the unit UTk or not is determined (Step S101). When it is judged that the notification that the feed was limited was received, a user is informed that the feed to the unit UTk has been limited by controlling an information device 12 (Step S102).

On the other hand, when it is judged that the notification that the feed was limited has not been received, the processing operation [4-3] is concluded at once.

Here, the battery monitoring device 34 controls the information device 12 so as to inform the user that the feed to the unit UTk has been limited. But in another embodiment, each unit UTk may control an information device so as to inform a user that a feed limitation has been imposed on the unit UTk.

Figure 13:
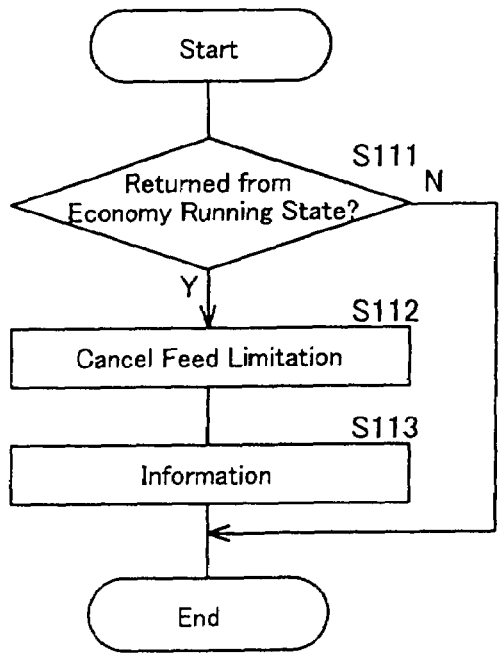
FIG. 13 is a flowchart showing a processing operation performed by the microcomputer in the battery monitoring device which constitutes the feed limiting system comprising the feed limiting device and the control devices according to the fourth embodiment.

A processing operation [4-4] performed by the microcomputer 35 in the battery monitoring device 34 which constitutes the feed limiting system comprising the feed limiting device and the control device according to the fourth embodiment is described below with a flowchart shown in FIG. 13. Here, the processing operation [4-4] is conducted at every prescribed interval when a feed limiting condition has been satisfied.

Whether an economy running state was cancelled or not is judged based on data sent from an economy running control device 1 (Step S111). When it is judged that the economy running state was cancelled, it is decided that a cancel condition of feed limitations on the units UT1-UTn has been satisfied, and processing for canceling feed limitations on the units UT1-UTn is conducted (Step S112). Thereafter, by controlling the information device 12, the user is informed that the feed limitations on the units UT1-UTn were cancelled (Step S113).

On the other hand, when it is judged that the economy running state has not been cancelled, the processing operation [4-4] is concluded at once.

Concrete examples of the processing for canceling feed limitations on the units UT1-UTn are shown below.

1. A notification that a cancel condition for canceling feed limitations has been satisfied is sent to the units UT1-UTn.

2. Opened switches SW1-SWn are closed.

Figure 14:
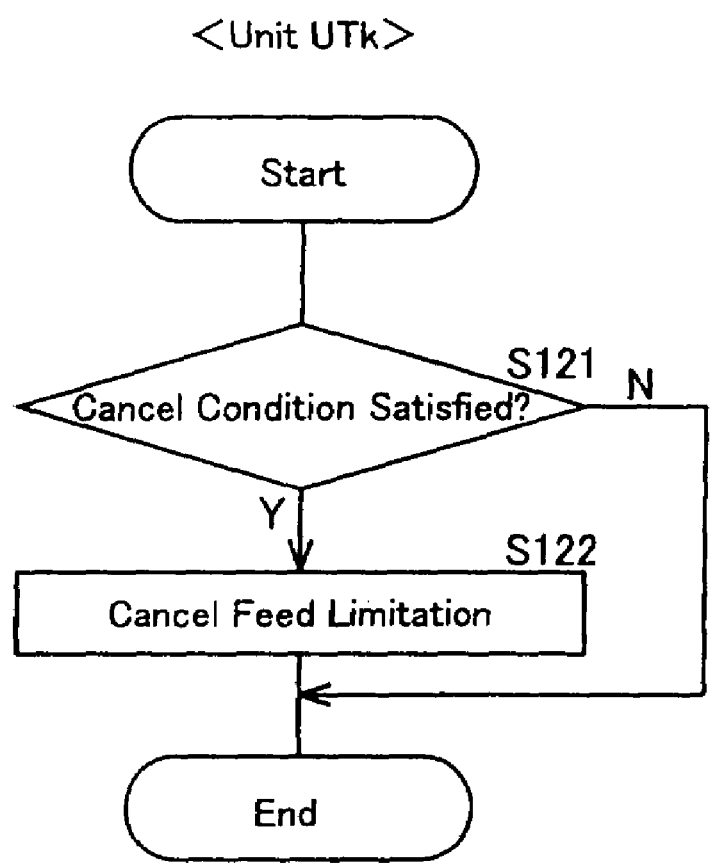
FIG. 14 is a flowchart showing a processing operation performed by the microcomputer in the unit which constitutes the feed limiting system comprising the feed limiting device and the control devices according to the fourth embodiment.

A processing operation [4-5] performed by the microcomputer in the unit UTk (k is any of 1-n) which constitutes the feed limiting system comprising the feed limiting device and the control devices according to the fourth embodiment is described below with a flowchart shown in FIG. 14. Here, the processing operation [4-5] is conducted at every prescribed interval.

Whether a cancel condition of feed limitation on the unit UTk has been satisfied or not is determined based on information sent from the battery monitoring device 34 (Step S121). When it is judged that the cancel condition of feed limitation has been satisfied, based on data showing the operating status of the unit UTk before the feed limitation stored in the memory, the unit UTk is returned to its status before the feed limitation (Step S122).

On the other hand, when it is judged that the cancel condition of feed limitation has not been satisfied, the processing operation [4-5] is concluded at once.

By using the feed limiting system comprising the feed limiting device and the control devices according to the fourth embodiment, when it is judged that a feed limiting condition for limiting a feed to the unit UTk (e.g. an air conditioner, an audio system or lamps) has been satisfied, a notification of the satisfaction of the feed limiting condition is sent to the unit UTk (e.g. an ECU). As a result, with judgment of each unit UTk, the load of the unit UTk can be limited. Moreover, the feed limiting condition includes that the vehicle is in an economy running state. Therefore, when the vehicle is in the economy running state, it is possible to reduce an amount of used electricity of the battery 7 as required and to prevent the battery 7 from being excessively consumed.

Though the feed limiting condition includes that the vehicle is in the economy running state, to be in the economy running state does not automatically mean that the feed limiting condition is satisfied. In other words, even if the vehicle is in the economy running state, the feed limiting condition is not satisfied in some cases. Therefore, it is possible to prevent feed from being limited more than necessary when the vehicle is in the economy running state. Thus, since a limitation on the load of the unit UTk is properly conducted, it is possible not only to prevent excessive consumption of the battery 7 but also to lessen user discomfort. In addition, since it is not necessary for each unit UTk to judge whether the feed limiting condition has been satisfied or not, the load of processing on each unit UTk can be reduced.

Figure 15:
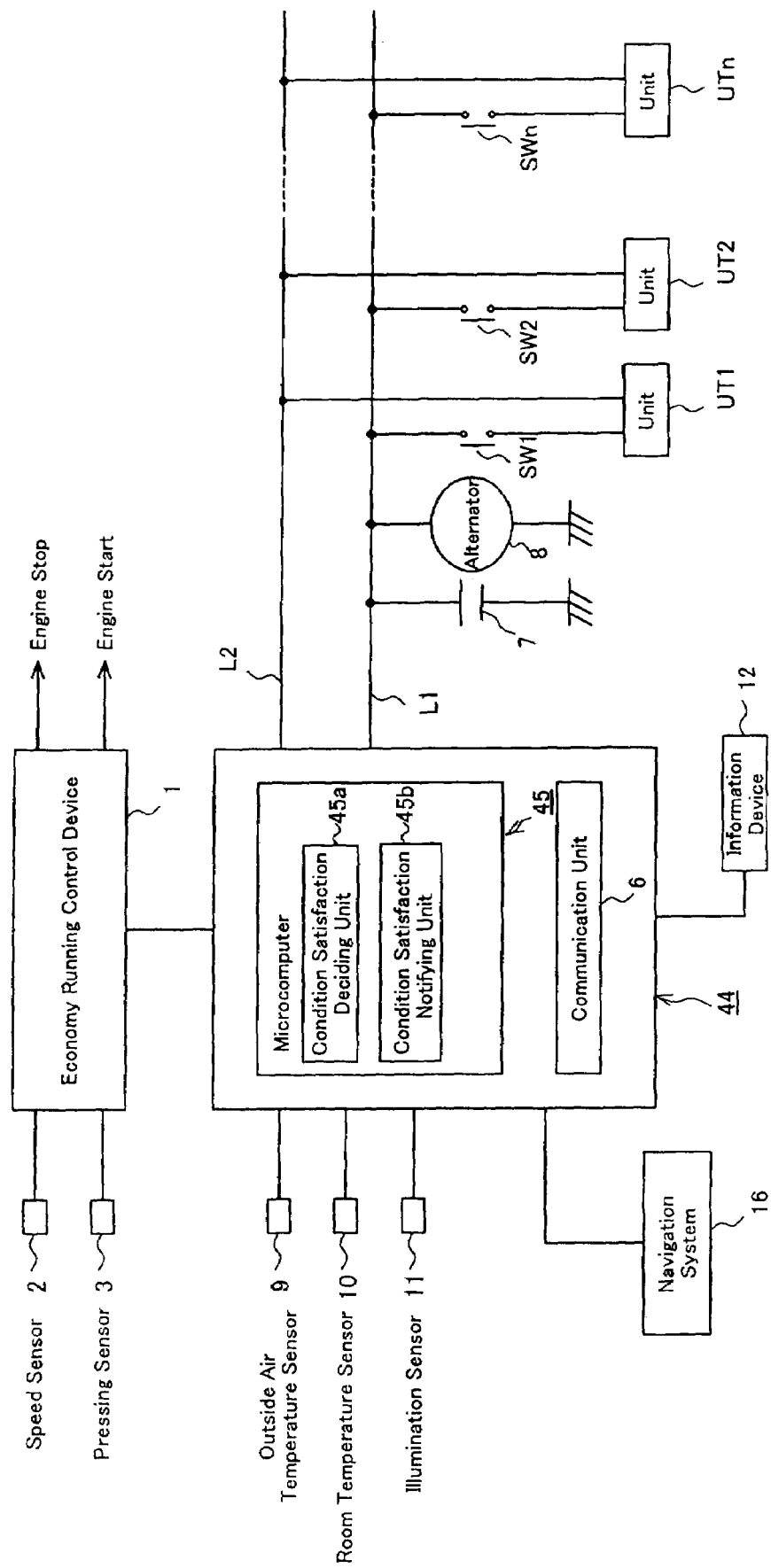
FIG. 15 is a block diagram schematically showing the principal part of a feed limiting system comprising a feed limiting device and control devices according to a fifth embodiment.

FIG. 15 is a block diagram schematically showing the principal part of a feed limiting system comprising a feed limiting device and control devices according to a fifth embodiment. Here, the same components as those of the feed limiting system shown in FIG. 9 are similarly marked and are not described below. Reference numeral 44 in FIG. 15 represents a battery monitoring device, comprising a microcomputer 45 and a communication unit 6 for conducting data communications with each kind of equipment. To the battery monitoring device 44, a power line L1 for supplying electric power sent from a battery 7 is connected. The microcomputer 45 comprises a feed limiting condition satisfaction deciding unit 45a and a feed limiting condition satisfaction notifying unit 45b for notifying units UT1-UTn that a feed limiting condition has been satisfied.

A navigation system 16 has a function of receiving radio beacons, light beacons and FM multiplex broadcasts. Therefore, the navigation system 16 can capture traffic jam information, traffic restriction information, signal waiting time information and the like, and sends the traffic jam information, the traffic restriction information, the signal waiting time information and position information to the battery monitoring device 44.

Figure 16:
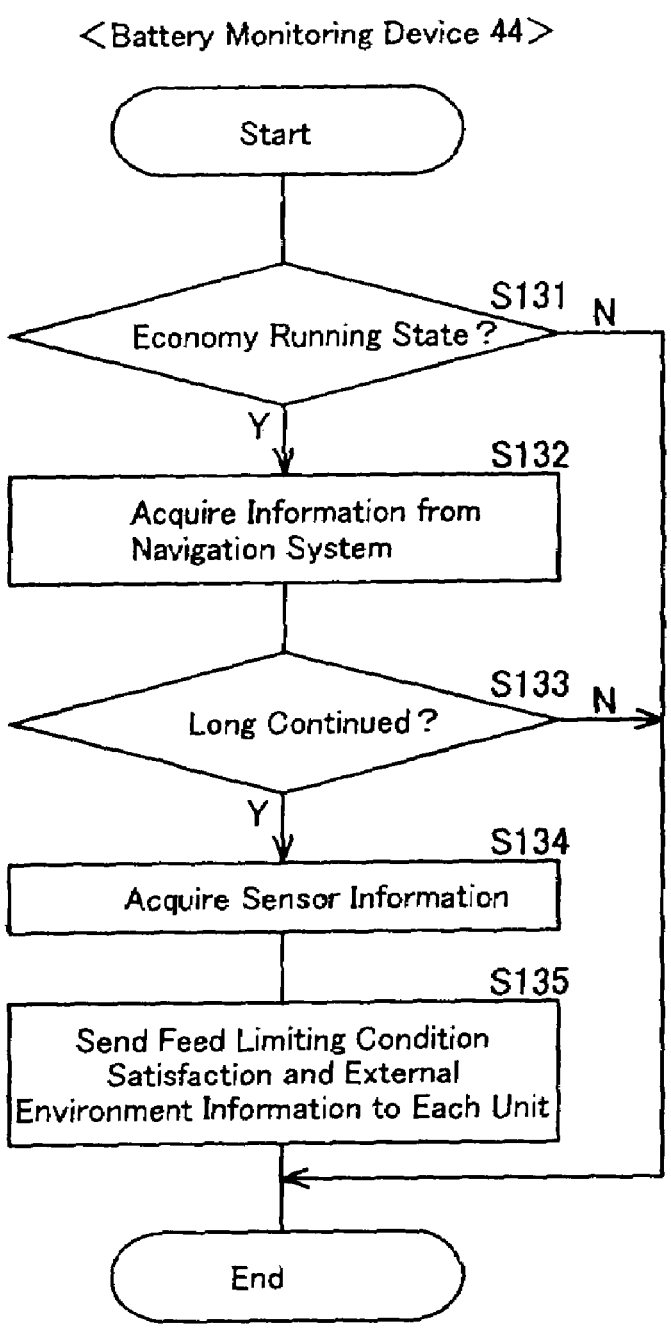
FIG. 16 is a flowchart showing a processing operation performed by a microcomputer in a battery monitoring device which constitutes the feed limiting system comprising the feed limiting device and the control devices according to the fifth embodiment.

A processing operation [5-1] performed by the microcomputer 45 in the battery monitoring device 44 which constitutes the feed limiting system comprising the feed limiting device and the control devices according to the fifth embodiment is described below with a flowchart shown in FIG. 16. Here, the processing operation [5-1] is conducted at every prescribed interval.

Whether a vehicle is in an economy running state or not is determined based on data sent from an economy running control device 1 (Step S131). When it is judged that the vehicle is in the economy running state, information used for a forecast for an economy running state continuation time is acquired from the navigation system 16 (Step S132). Based on the information obtained from the navigation system 16, whether or not the economy running state will be continued for a prescribed time T (e.g. 2 minutes) or more is determined (Step S133).

When it is judged that the economy running state will be continued for the prescribed time T or more, it is decided that a feed limiting condition to the units UT1-UTn has been satisfied, and external environment information is acquired from each kind of sensor 9-11 (Step S134). Thereafter, a notification that the feed limiting condition has been satisfied and the external environment information are sent to the units UT1-UTn (Step S135).

On the other hand, when it is judged that the vehicle is not in the economy running state in Step S131, or when it is judged that the economy running state will not be continued for the prescribed time T or more in Step S133, the processing operation [5-1] is concluded at once.

The microcomputer 45 in the battery monitoring device 44 which constitutes the feed limiting system comprising the feed limiting device and the control devices according to the fifth embodiment performs processing operations similar to the processing operations [4-3] (see FIG. 12) and [4-4] (see FIG. 13) performed by the microcomputer 35 in the battery monitoring device 34 shown in FIG. 9.

When the feed limiting system comprising the feed limiting device and the control devices according to the fifth embodiment is used, the feed limiting condition includes judged determination that the economy running state will be continued for the prescribed time T or more. Therefore, when the economy running state continuation time is too short, it is possible to prevent feed limitations on the units UT1-UTn from being conducted. As a result, occasions where a user feels discomfort can be reduced.

Figure 17:
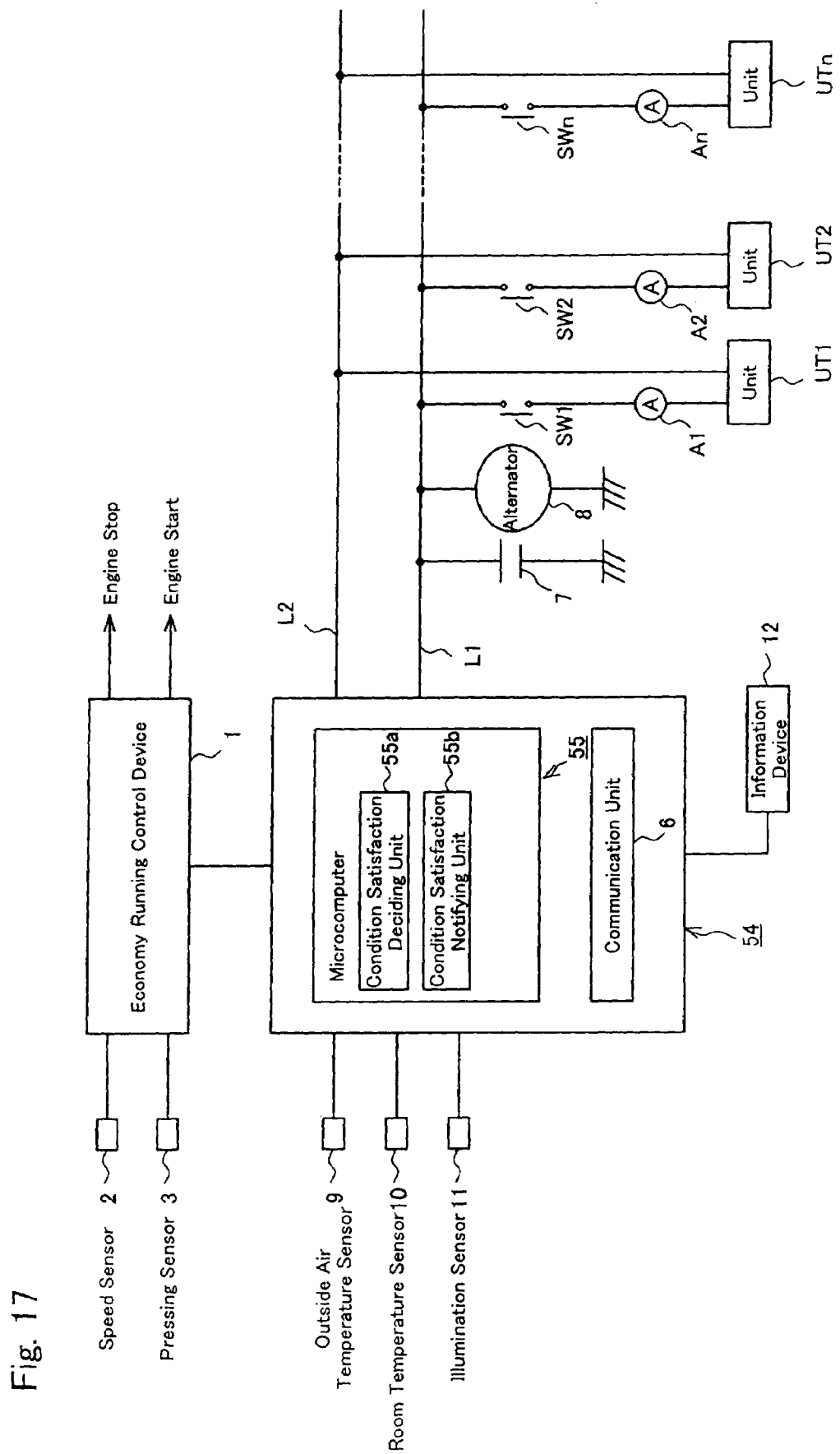
FIG. 17 is a block diagram schematically showing the principal part of a feed limiting system comprising a feed limiting device and control devices according to a sixth embodiment.

FIG. 17 is a block diagram schematically showing the principal part of a feed limiting system comprising a feed limiting device and control devices according to a sixth embodiment. Here, the same components as those of the feed limiting system shown in FIG. 9 are similarly marked and are not described below. Reference numeral 54 in FIG. 17 represents a battery monitoring device, comprising a microcomputer 55 and a communication unit 6 for conducting data communications with each kind of equipment. To the battery monitoring device 54, a power line L1 for supplying electric power sent from a battery 7 is connected. The microcomputer 55 comprises a feed limiting condition satisfaction deciding unit 55a and a feed limiting condition satisfaction notifying unit 55b for notifying units UT1-UTn that a feed limiting condition has been satisfied.

Current sensors A1-An are used for detecting amounts of electricity (load working current) consumed by the units UT1-UTn. Though it is not shown, the current sensors A1-An are connected to the battery monitoring device 54, and the battery monitoring device 54 (the microcomputer 55 thereof) can determine the amounts of electricity consumed by the units UT1-UTn.

Figure 18:
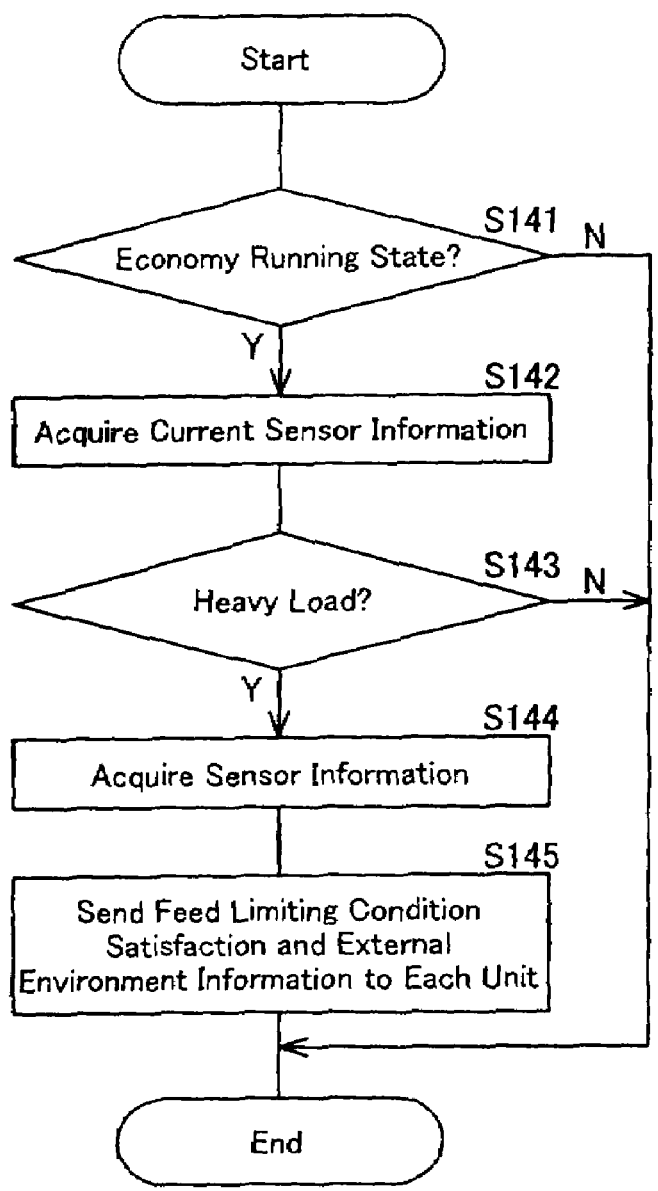
FIG. 18 is a flowchart showing a processing operation performed by a microcomputer in a battery monitoring device which constitutes the feed limiting system comprising the feed limiting device and the control devices according to the sixth embodiment.

A processing operation [6-1] performed by the microcomputer 55 in the battery monitoring device 54 which constitutes the feed limiting system comprising the feed limiting device and the control devices according to the sixth embodiment is described below with reference to a flowchart shown in FIG. 18. Here, the processing operation [6-1] is conducted at every prescribed interval.

Whether a vehicle is in an economy running state or not is judged based on data sent from an economy running control device 1 (Step S141). When it is judged that the vehicle is in the economy running state, information used for judging 'a heavy load' is acquired from the current sensors A1-An (Step S142). Based on the data obtained from the current sensors A1-An, whether or not the amount of electricity consumed by the units UT1-UTn is a prescribed value I (e.g. 100A) or more is determined (Step S143).

When it is judged that the amount of electricity consumed by the units UT1-UTn is the prescribed value I or more, it is decided that a feed limiting condition to the units UT1-UTn has been satisfied, and external environment information is acquired from each kind of sensor 9-11 (Step S144). Thereafter, a notification that the feed limiting condition has been satisfied and the external environment information are sent to the units UT1-UTn (Step S145).

On the other hand, when it is judged that the vehicle is not in the economy running state in Step S141, or when it is judged that the amount of electricity consumed by the units UT1-UTn is less than the prescribed value I in Step S143, the processing operation [6-1] is concluded at once.

Even if the vehicle is in the economy running state, an alternator 8 whose drive source is an engine is not generating electric power, and therefore, a power supply to the units UT1-UTn is conducted only with electric power from the battery 7, there is a low risk that the battery 7 may be excessively consumed when the amount of electricity consumed by the units UT1-UTn is not large. Therefore, when the amount of electricity consumed by the units UT1-UTn is less than the prescribed value I, the feed limiting condition is regarded as being unsatisfied and the processing operation [6-1] is concluded.

The microcomputer 55 in the battery monitoring device 54 which constitutes the feed limiting system comprising the feed limiting device and the control devices according to the sixth embodiment performs processing operations similar to the processing operations [4-3] (see FIG. 12) and [4-4] (see FIG. 13) performed by the microcomputer 35 in the battery monitoring device 34 shown in FIG. 9.

When the feed limiting system comprising the feed limiting device and the control devices according to the sixth embodiment is used, the feed limiting condition includes that it is judged that the amount of electricity consumed by the units UT1-UTn is the prescribed value I or more. Therefore, it is possible to prevent feed limitations on the units UT1-UTn from being conducted when the amount of electricity consumed by the units UT1-UTn is small (i.e. there is a low risk of excessive consumption of the battery 7). As a result, occasions where a user feels discomfort can be reduced.

By the way, as described above, even if the vehicle is in the economy running state, the alternator 8 whose drive source is the engine is not generating electric power, and therefore, a power supply to the units UT1-UTn is conducted only with electric power from the battery 7, there is a low risk that the battery 7 may be excessively consumed when the amount of electricity consumed by the units UT1-UTn is not large.

However, under the same conditions of amount of electricity consumed by the units UT1-UTn, if a charging rate SOC of the battery 7 is high, consumption of the battery 7 does not excessively progress. But if the charging rate SOC of the battery 7 is low, there is a risk that consumption of the battery 7 may excessively progress. Thus, it is considered that the condition of the battery has an influence on a consumption speed.

Then, in another embodiment, a prescribed value I may be set based on a battery condition (e.g. a battery charging rate SOC). For example, when the battery charging rate SOC is high, the prescribed value I is set to be small, and when the battery charging rate SOC is low, the prescribed value I is set to be large.

When the feed limiting systems comprising the feed limiting devices and the control devices according to the fourth to sixth embodiments are used, the notification that the feed limiting condition has been satisfied is simultaneously sent to the units UT1-UTn. However, in another embodiment, while checking feed limitation states of units UT1-UTn, a notification that a feed limiting condition has been satisfied may be sent to the units UT1-UTn one after another. Thus, at the time when an amount of electricity consumed by the units UT1-UTn reached a prescribed value or less, load limiting processing on the units UT1-UTn can be concluded. In still another embodiment, feed limitations may be imposed on units having no relation with continuation of an economy running state with first priority. For example, units UT1-UT3 on which load control is conducted first are set to be an air conditioner, lamps and an audio system.

Hitherto, the cases where the economy running control device 1 and the battery monitoring device 4, 14, 24, 34, 44 or 54 are separate have been described, but these devices may not be separate but be united into one. For example, one CPU may be allowed to conduct both the processing performed by the economy running control device 1 and the processing performed by the battery monitoring device 4, 14, 24, 34, 44 or 54.

What is claimed is:

1. A feed limiting device for limiting an amount of electrical feed to electrical components mounted on a vehicle in an economy running state, comprising:

a condition satisfaction judging unit for determining whether a feed limiting condition for limiting the amount of electrical feed to the electrical components has been satisfied or not, the feed limiting condition including that the vehicle is in the economy running state; and a load control unit for limiting the amount of electrical feed to the electrical components such that the amount of electrical feed to the electrical components is below an ordinary level of electrical feed, the ordinary level of electrical feed being a level of electrical feed to the electrical components to operate the electrical components when the feed limiting condition has not been satisfied said load control unit being operable to limit the amount of electrical feed by controlling and limiting the load of each of the electrical components based on an external environment and an operating status of each of the electrical components when said condition satisfaction judging unit has determined that the feed limiting condition has been satisfied;

wherein said load control unit is further operable to interrupt the limiting of the amount of electrical feed to the electrical components when the feed limiting condition has been satisfied so as to not limit the load and to thereby supply the ordinary level of electrical feed to each of the electrical components to which it has been determined that the ordinary level of electrical feed must be maintained although the feed limiting condition has been satisfied.

2. The feed limiting device of claim 1, wherein said load control unit is operable to determine a content of load limitations on each of the electrical components to which it was determined that the ordinary level of electrical feed did not have to be maintained or no electrical feed was required, and to limit the load of each of the electrical components based on the determined content of the load limitations.

3. The feed limiting device of claim 1, further comprising a storage unit for storing statuses of the electrical components before said load control unit applies load limitations for limiting the electrical feed to the electrical components.

4. The feed limiting device of claim 1, further comprising:
a continuation judging unit for determining whether the economy running state will be continued for at least a prescribed amount of time,
wherein the feed limiting condition further includes a determination by said continuation judging unit that the economy running state will be continued for at least the prescribed time.

5. The feed limiting device of claim 1, further comprising:
a consumption status judging unit for determining whether an amount of electricity consumed by the electrical components mounted on the vehicle is at least a prescribed value,
wherein the feed limiting condition further includes a determination by said consumption status judging unit that the amount of electricity consumed by the electrical components is at least the prescribed value.

6. The feed limiting device of claim 5, further comprising:
a setting unit for setting the prescribed value based on a battery condition,
wherein said consumption status judging unit is operable to make the determination of the amount of electricity based on the prescribed value set by said setting unit.

7. The feed limiting device of claim 1, wherein said load control unit is operable to impose the electrical feed limitations on the electrical components with relation to a continuation of the economy running state.

8. The feed limiting device of claim 1, wherein said load control unit is operable to control an electrical feed from a battery to the electrical components such that, if the feed limiting condition has been satisfied, said load control unit is operable to:
(i) limit an electrical feed from the battery to the electrical components based on the external environment and the operating status of each of the electrical components; and
(ii) not limit the electrical feed from the battery to the electrical components if said load control unit determines that the electrical feed must be maintained based on the external environment and the operating status of each of the electrical components.

9. A feed limiting device for limiting feed to electrical components mounted on a vehicle in an economy running state, comprising:
a condition satisfaction judging unit for determining whether a feed limiting condition for limiting the feed to the electrical components has been satisfied or not, the feed limiting condition including that the vehicle is in the economy running state;
a load control unit for limiting the feed to the electrical components by controlling the load of each of the electrical components based on an external environment and an operating status of each of the electrical components when said condition satisfaction judging unit has determined that the feed limiting condition has been satisfied, wherein said load control unit is further operable to not limit the load and to thereby not limit the feed to each of the electrical components to which it has been determined that the present feed must be maintained;
a storage unit for storing statuses of the electrical components before said load control unit applies load limitations for limiting the feed to the electrical components;
a cancel condition satisfaction judging unit for determining whether a cancel condition of feed limitations has been satisfied or not; and
a return control unit for returning each electrical component to the status of the electrical components before the load limitations were applied when said cancel condition satisfaction judging unit determines that the cancel condition of feed limitations has been satisfied.

10. A control device for controlling an electrical component mounted on a vehicle, comprising:
a load control unit for limiting an amount of electrical feed to the electrical component such that the amount of electrical feed to the electrical component is below an ordinary level of electrical feed the ordinary level of electrical feed being a level of electrical feed to the electrical component to operate the electrical component when a feed limiting condition has not been satisfied, said load control unit being operable to limit the amount of electrical feed by controlling and limiting a load of the electrical component based on an external environment and an operating status of the electrical component when receiving a notification that the feed limiting condition for limiting the feed to the electrical component has been satisfied, the feed limiting condition including that the vehicle is in an economy running state;
wherein said load control unit is further operable to interrupt the limiting of the amount of electrical feed to the electrical component when the feed limiting condition has been satisfied so as to not limit the load and to thereby supply the ordinary level of electrical feed to the electrical component when it has been determined that the ordinary level of electrical feed must be maintained although the feed limiting condition has been satisfied.

11. The control device of claim 10, wherein said load control unit is operable to stop the electrical feed to the electrical component when it has been determined that no feed is required.

12. The control device of claim 10, wherein said load control unit is operable to determine a content of load limitation on the electrical component when it has been determined that the ordinary level of electrical feed did not need to be maintained or no electrical feed was required, and to limit the load of the electrical component based on the determined content of load limitation.

13. The control device of claim 10, further comprising a storage unit for storing a status of the electrical component before said load control unit applies load limitations for limiting the electrical feed to the electrical component.

14. The control device of claim 13, further comprising a return control unit for returning the electrical component to the status of the electrical component before the load limitation was applied when said return control unit has received a notification that a cancel condition for canceling the feed limitation on the electrical component has been satisfied.

15. The control device of claim 10, wherein said load control unit is operable to control an electrical feed from a battery to the electrical component such that, if the feed limiting condition has been satisfied, said load control unit is operable to:

(i) limit an electrical feed from the battery to the electrical component based on the external environment and the operating status of the electrical component; and (ii) not limit the electrical feed from the battery to the electrical component if said load control unit determines that the electrical feed must be maintained based on the external environment and the operating status of the electrical component.

\* \* \* \* \*